(12) United States Patent
Kilby et al.

(10) Patent No.: US 6,401,435 B1
(45) Date of Patent: Jun. 11, 2002

(54) PATTERN FORMER AND METHOD OF PATTERN FORMING FOR WRAPPED BAKERY PRODUCTS

(75) Inventors: Leonard R. Kilby, Plano; John M. Lucido, Garland, both of TX (US); John D. Leatherbee, St. Ignatius, MT (US); James J. Diver, Orland Park, IL (US)

(73) Assignee: SASIB North America, Inc., Plano, TX (US)

( * ) Notice: Subject to any disclaimer, the term of this patent is extended or adjusted under 35 U.S.C. 154(b) by 0 days.

(21) Appl. No.: 09/587,127

(22) Filed: Jun. 2, 2000

Related U.S. Application Data

(60) Provisional application No. 60/159,627, filed on Oct. 14, 1999.

(51) Int. Cl.[7] .............................. B65B 35/30; B65B 5/10
(52) U.S. Cl. .............................. 53/448; 53/475; 53/543; 53/252; 198/377.04; 198/428; 414/788.6; 414/792.4; 414/790.3
(58) Field of Search .......................... 53/443, 446, 448, 53/473, 475, 147, 544, 251, 252, 253, 537, 543; 414/788.6, 790.3, 790.8, 792.4, 793, 794.7; 198/428, 377.04

(56) References Cited

U.S. PATENT DOCUMENTS

| | | | | |
|---|---|---|---|---|
| 2,633,251 A | * | 3/1953 | Bruce | 53/544 X |
| 3,396,507 A | * | 8/1968 | Morris et al. | 53/544 X |
| 4,481,752 A | * | 11/1984 | Sabel | 53/448 |
| 4,522,292 A | * | 6/1985 | Euverard et al. | 414/792.4 X |
| 4,714,926 A | * | 12/1987 | Mennie et al. | 53/443 |
| 4,720,958 A | * | 1/1988 | Wright et al. | 53/537 X |
| 4,856,263 A | * | 8/1989 | Schneider et al. | 53/543 |
| 5,265,400 A | * | 11/1993 | Roberts et al. | 53/500 |
| 5,317,859 A | * | 6/1994 | Schneider et al. | 53/251 X |
| 5,535,999 A | * | 7/1996 | Ford | 198/377.03 X |
| 6,061,996 A | * | 5/2000 | Vissers et al. | 53/251 X |

* cited by examiner

*Primary Examiner*—Stephen F. Gerrity
(74) *Attorney, Agent, or Firm*—Michael A. O'Neil

(57) ABSTRACT

A pattern former for assembling wrapped bakery products into predetermined patterns includes a vacuum turntable comprising a perforated plate which is driven by a belt extending around the periphery of the vacuum turntable and actuated by a motor. A first transfer apparatus includes a pusher plate which moves groups of wrapped bakery products onto the vacuum turntable and which retracts to facilitate the formation of a subsequent group of wrapped bakery products as a previous group is being transferred to the vacuum turntable. A second transfer apparatus includes a pusher plate which moves assembled patterns of wrapped bakery products from the vacuum turntable into bakery trays and which is retractable to facilitate the assembly of a subsequent pattern of wrapped bakery products as a previous pattern is being transferred to a bakery tray.

32 Claims, 37 Drawing Sheets

PATTERN FORMER AND METHOD OF PATTERN FORMING FOR WRAPPED BAKERY PRODUCTS

CROSS REFERENCE TO RELATED APPLICATIONS

This application claims the benefit of U.S. Provisional Application Ser. No. 60/159,627, filed Oct. 14, 1999.

TECHNICAL FIELD

This invention relates generally to pattern formers for bakery products, and more particularly to apparatus for assembling wrapped bakery products into predetermined patterns prior to the loading thereof into bakery trays.

BACKGROUND AND SUMMARY OF THE INVENTION

The operation of a modern commercial bakery in the manufacture of bakery products such as sliced bread loaves begins with the preparation of dough which is deposited into baking pans, proofed, and baked. Thereafter, the baked loaves of bread are removed from the pans, cooled, sliced, wrapped in plastic film, and loaded into bakery trays for delivery to retail outlets.

As is well known, bread and other wrapped bakery products such as hamburger buns, hot dog buns, etc. are available in a seemingly infinite number of sizes. However, commercial bakeries do not typically provide bakery trays which are configured to receive particular bakery products. Rather, commercial bakeries typically employ one type, or at most a few types, of bakery trays which are used to receive and transport a wide variety of bakery products.

Prior to being loaded into bakery trays, bakery products are arranged in predetermined patterns, the purpose being to assure the most efficient loading of a particular tray configuration with a particular bakery product to be received therein. In addition to loading efficiency, the positioning of the tails of the wrapped bakery products, that is, the openable ends thereof which are tied or otherwise secured during transport, is also taken into consideration. Preferably, the tails of the wrapped bakery products face inwardly thereby preventing snagging or tearing during transport.

The apparatus that is used to arrange wrapped bakery products in predetermined patterns prior to the loading thereof into bakery trays is known as a pattern former. Typically, a pattern former receives individually wrapped bakery products from the wrapping apparatus, arranges the received wrapped bakery products in groups comprising between 1 and about 6 wrapped bakery products, assembles at least 2 and as many as several groups of wrapped bakery products relative to one another to form the predetermined pattern, then positions the entire pattern of wrapped bakery products in a bakery tray for transport.

U.S. Pat. No. 4,522,292 granted to Euverard, et al. on Jun. 11, 1985; U.S. Pat. No. 4,856,263 granted to Schneider, et al. on Aug. 15, 1989; and U.S. Pat. No. 5,317,859 granted to Schneider, et al. on Jun. 7, 1994 illustrate and describe prior art pattern formers. The pattern formers of the prior art are relatively complex in design and are therefore costly to purchase and maintain. Perhaps more importantly, prior art pattern formers are relatively slow in operation, achieving the maximum rate of about 60 loaves per minute. This means that several of the prior art pattern formers are required in order to fill bakery trays with wrapped bakery products at a rate that is compatible with the output of a typical bakery product wrapping apparatus.

The present invention comprises an improved pattern former for wrapped bakery products which overcomes the foregoing and other deficiencies which have long since characterized the prior art. In particular, the pattern former of the present invention has an operational speed of 100 loaves per minute which means that a significantly smaller number of pattern formers is required in order to fulfill the pattern forming requirements of the modern commercial baking operation. This results in substantial savings to the bakery operator both in terms of initial cost and in terms of maintenance requirements.

The use of pattern formers incorporating the present invention is also advantageous in that pattern formers constructed in accordance with the invention are adapted to receive wrapped bakery products along the same axis and from the same bakery product inputting devices that have been used to supply pattern formers of the prior art, and to deliver filled bakery trays along the same axis and to the same bakery tray receiving apparatus that has been used with prior art pattern formers. This means that the pattern former of the present invention can be installed in an existing bakery without reconfiguring the bakery and without repositioning the apparatus which deliver wrapped bakery products to and receive filled bakery trays from the pattern former.

More particularly, the pattern former of the present invention employs a vacuum turntable to receive groups of wrapped bakery products and to assemble the groups of wrapped bakery products into patterns. The use of the vacuum turntable of the present invention is advantageous in that by means thereof wrapped bakery products are received and accurately positioned within predetermined patterns without damage either to the bakery products or the wrapping thereof.

The pattern former of the present invention further includes apparatus for transferring groups of wrapped bakery products onto the vacuum turntable while simultaneously assembling a second group of wrapped bakery products. A similar apparatus transfers patterns of wrapped bakery products into bakery trays while a subsequent pattern is simultaneously being formed. As will be appreciated by those skilled in the art, the ability of the pattern former of the present invention to perform multiple tasks simultaneously significantly increases the throughput rate of the pattern former.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
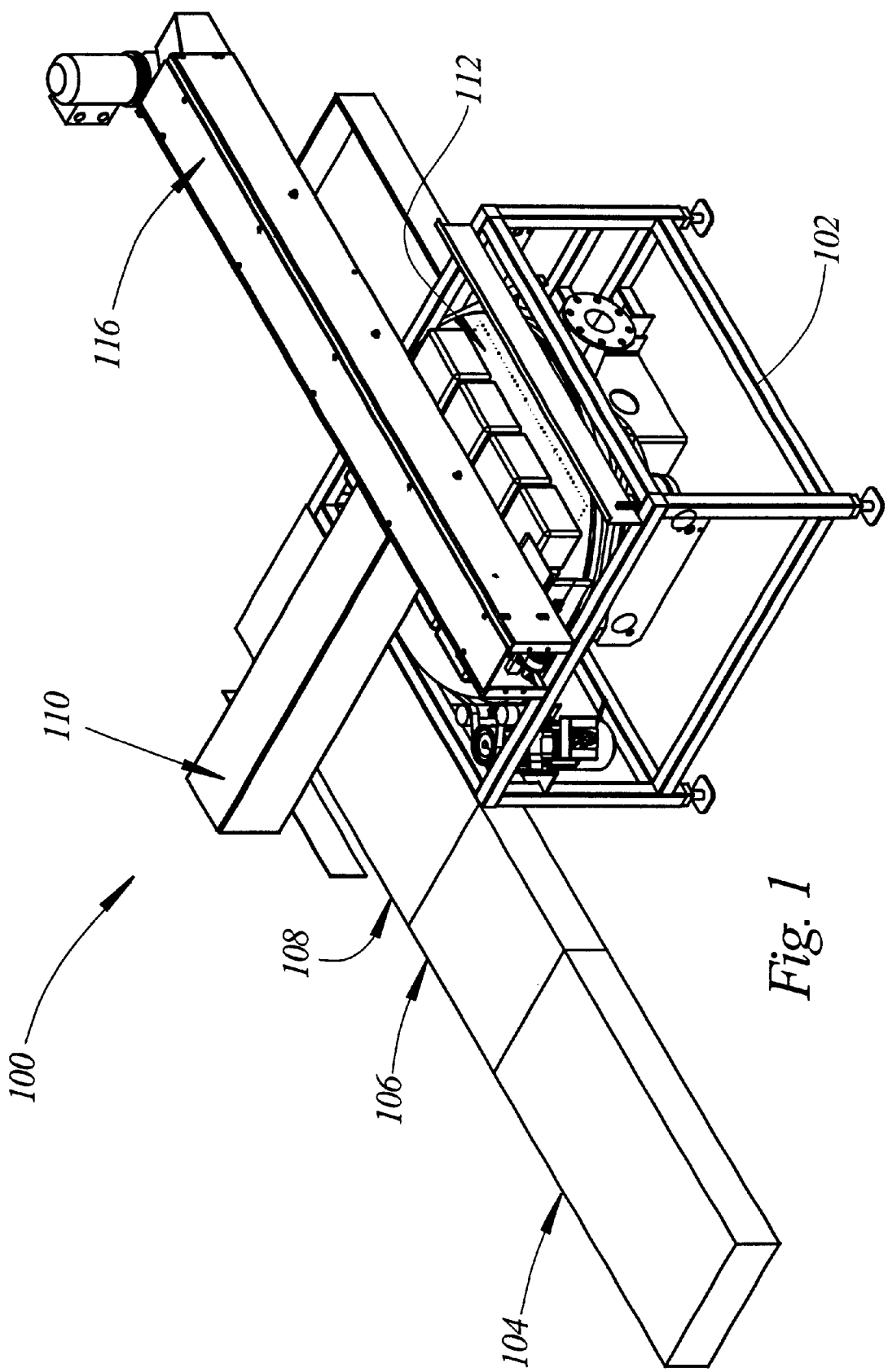
FIG. 1 is a perspective view of a pattern former incorporating the invention.
Figure 2:
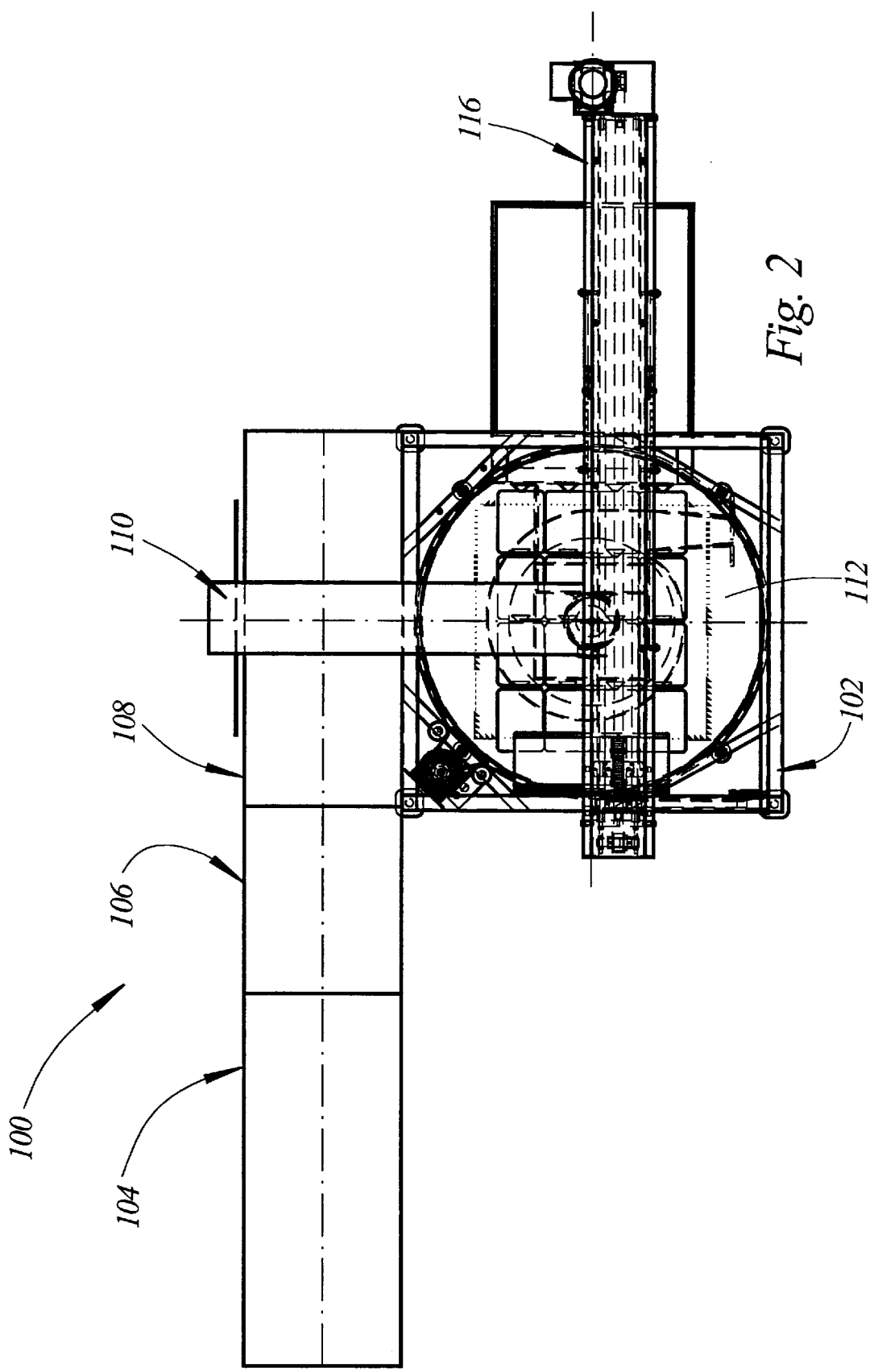
FIG. 2 is a top view of the pattern former of FIG. 1.

Referring now to the Drawings, and particularly to FIG. 1, there is shown a pattern former 100 incorporating the present invention. The pattern former 100 includes a frame 102 which supports the various component parts of the pattern former. The frame 102 is conventional in design and may comprise lengths of tubular, channel, or bar stock which are secured together by welding or by means of conventional fasteners.

The pattern former 100 includes an intake conveyor 104 which receives wrapped bakery products from a conventional wrapped bakery product inputting apparatus such as the delivery conveyor of a bakery product wrapping apparatus. A gating conveyor 106 receives wrapped bakery products from the intake conveyor 104 and delivers wrapped bakery products to a grouping apparatus 108. The intake conveyor 104, the gating conveyor 106, and the grouping apparatus 108 function to arrange wrapped bakery products received by the pattern former 100 in groups of wrapped bakery products, each group comprising from between 1 to about 6 wrapped bakery products depending on the particular pattern of wrapped bakery products to be formed.

The pattern former 100 further includes a transfer apparatus 110 which transfers groups of wrapped bakery products from the grouping conveyor 108 onto a vacuum turntable 112. An important feature of the present invention comprises the fact that the transfer apparatus 110 is adapted to transfer a first group of wrapped bakery products to the vacuum turntable 112 while a subsequent group of wrapped bakery products is being arranged on the grouping apparatus 108. The ability of the pattern former of the present invention to perform these two functions simultaneously comprises a significant improvement over the prior art which results in the pattern former of the present invention having a significantly improved throughput rate when compared with prior art pattern formers.

The vacuum turntable 112 functions to receive groups of wrapped bakery products from the transfer apparatus 110 and to assemble the groups of wrapped bakery products into predetermined patterns. After a predetermined pattern of wrapped bakery products is formed, a transfer apparatus 116 transfers the pattern of wrapped bakery products from the vacuum turntable 112 to a bakery tray.

An important feature of the present invention comprises the fact that the transfer apparatus 116 is adapted to transfer a pattern of wrapped bakery products from the vacuum turntable 112 to a bakery tray while a subsequent pattern of wrapped bakery products is being assembled on the turntable 112. The ability of the pattern former of the present invention to perform these two functions simultaneously comprises a significant improvement in that it substantially increases the throughput rate of the pattern former of the present invention when compared with prior art pattern formers.

Vacuum is applied to the vacuum turntable 112 by a vacuum generating apparatus 118 situated beneath the vacuum turntable 112. The vacuum generating apparatus 118 typically comprises a vacuum pump and a manifold connected to the vacuum pump for applying vacuum evenly across the entire diameter of the vacuum turntable 112. As will be appreciated by those skilled in the art, other types and kinds of vacuum generating apparatus may be utilized in the practice of the invention depending upon the requirements of particular applications thereof. The intensity of the vacuum that is applied to the vacuum turntable 112 is likewise dependent on the diameter of the vacuum turntable, the rotational speed at which the vacuum turntable is operated, and the types and kinds of wrapped bakery products which are handled by the vacuum turntable.

Figure 3:
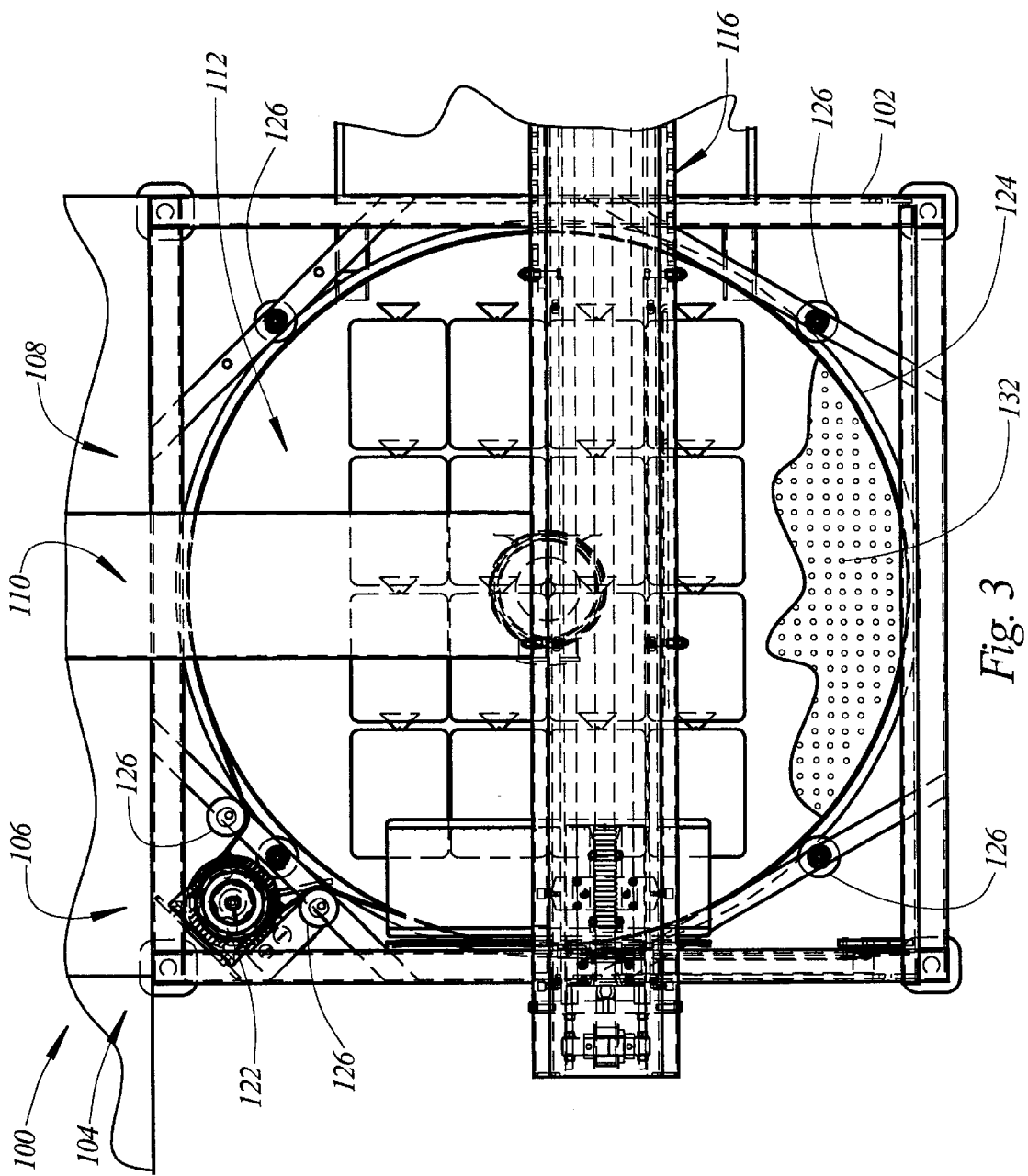
FIG. 3 is an enlargement of a portion of FIG. 2.
Figure 4:
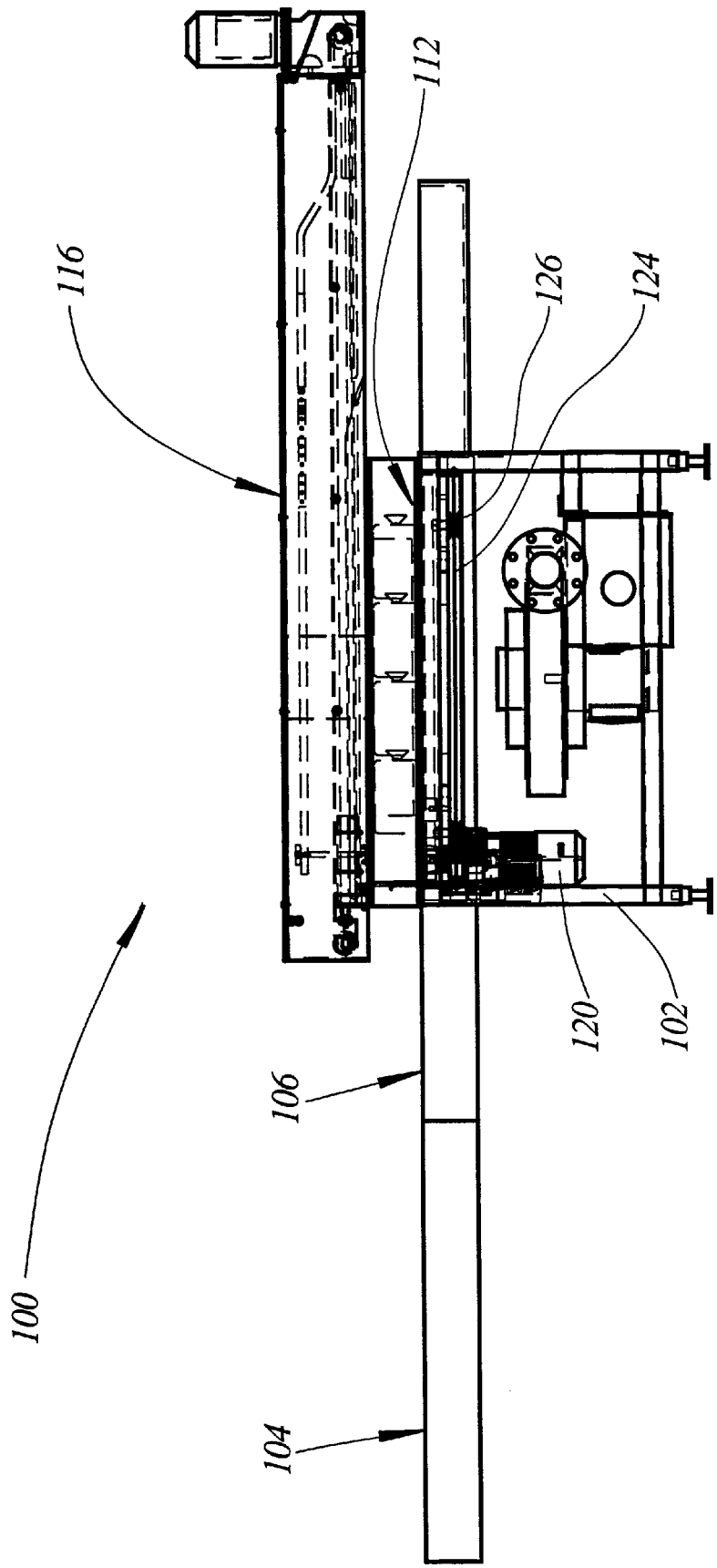
FIG. 4 is a side view of the pattern former of FIG. 1.
Figure 5:
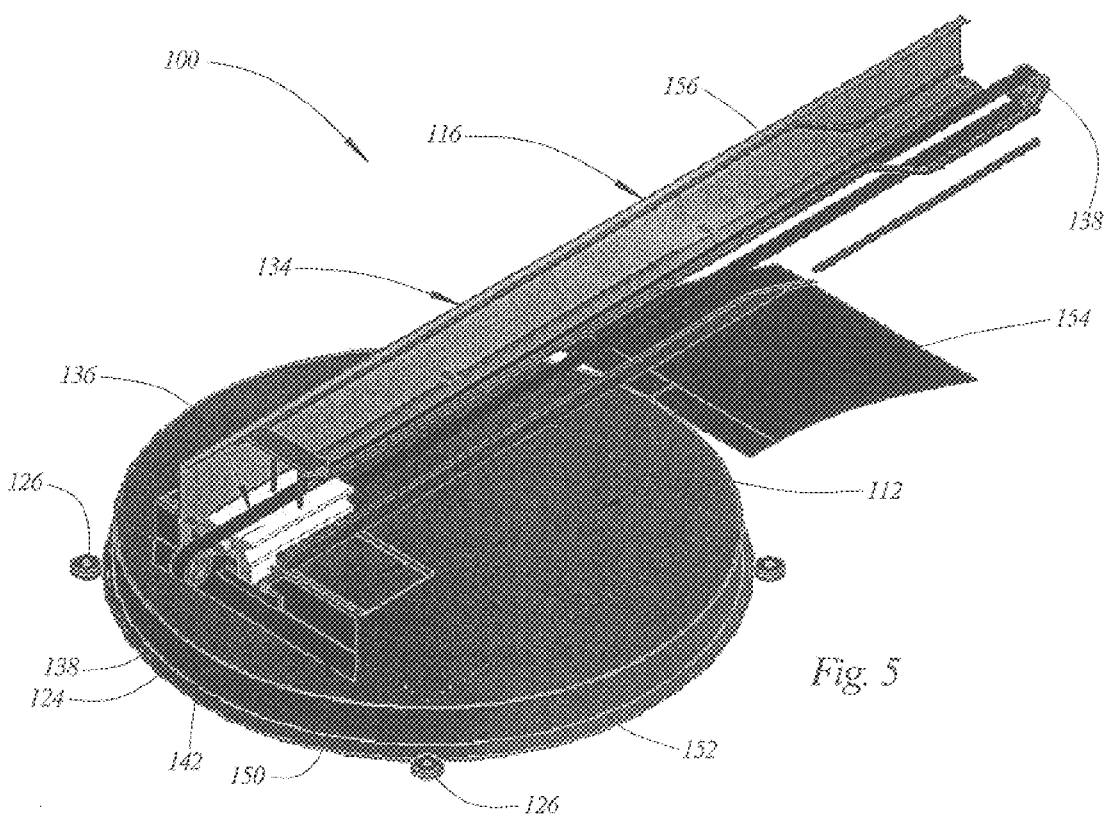
FIG. 5 is a perspective view illustrating the vacuum turntable and the apparatus for filling bakery trays with patterns of wrapped bakery products comprising the pattern former of FIG. 1.
Figure 6:
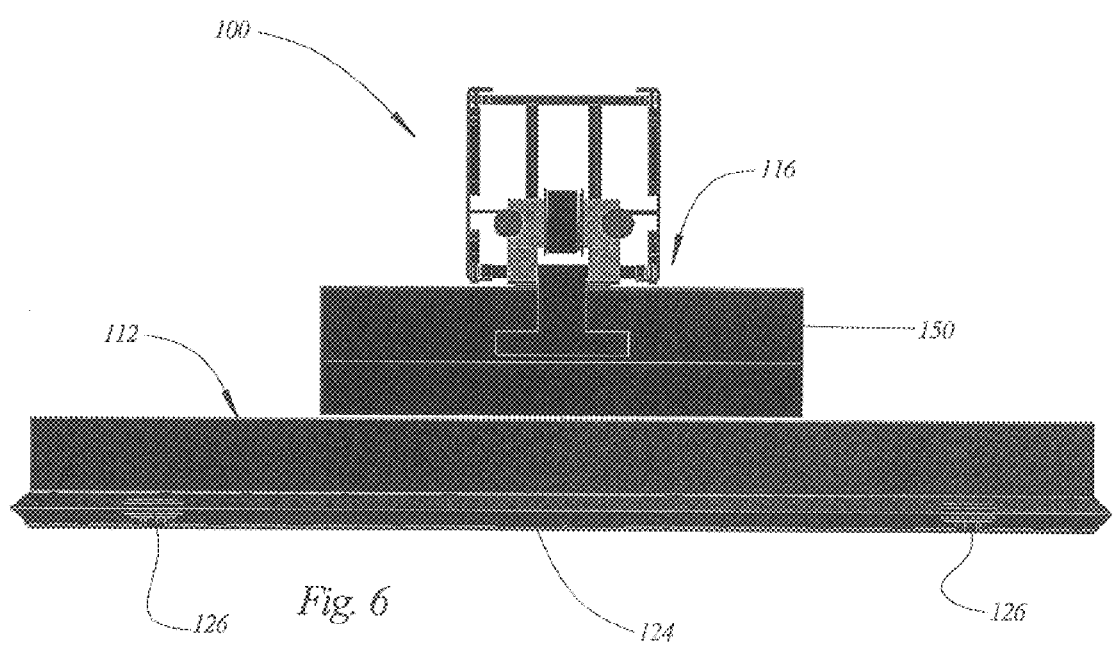
FIG. 6 is an end view of the apparatus of FIG. 5.
Figure 7:
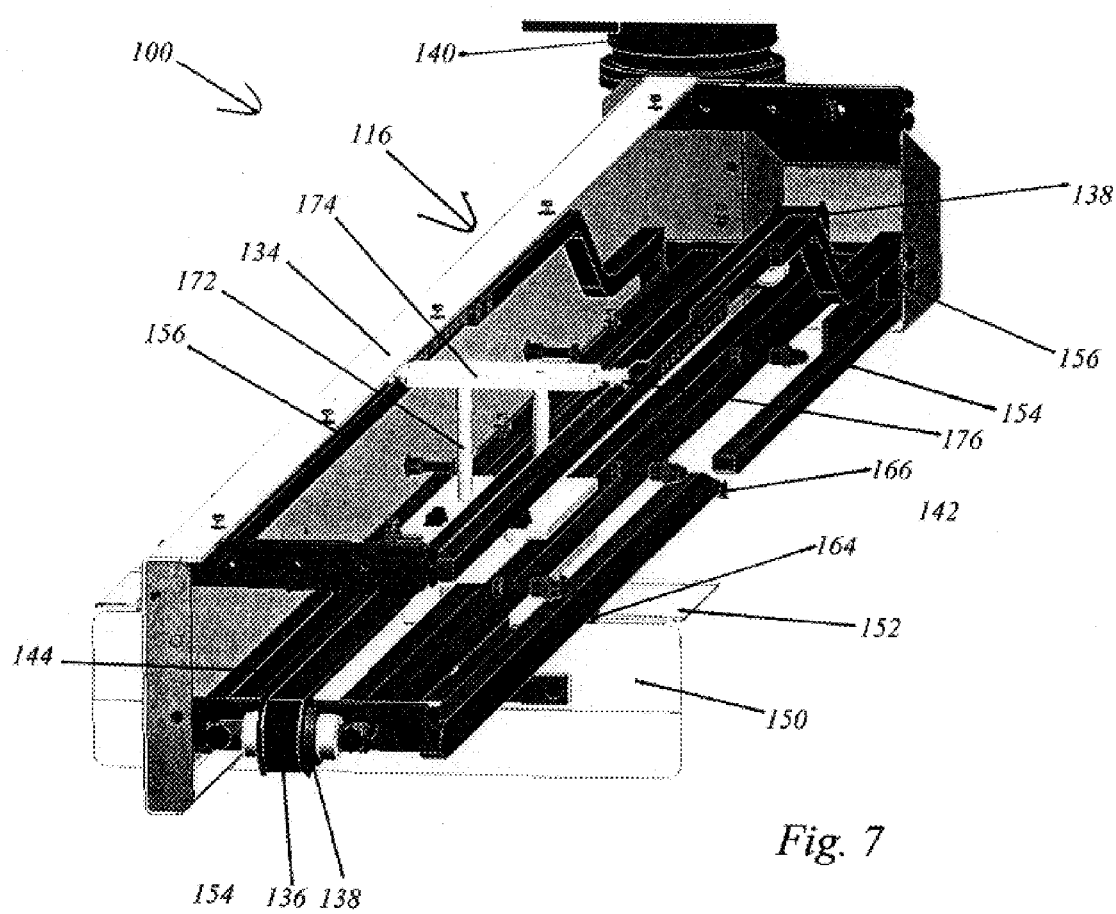
FIG. 7 is a front perspective view of the apparatus for transferring patterns of wrapped bakery products into bakery trays comprising the pattern former of FIG. 1.
Figure 8:
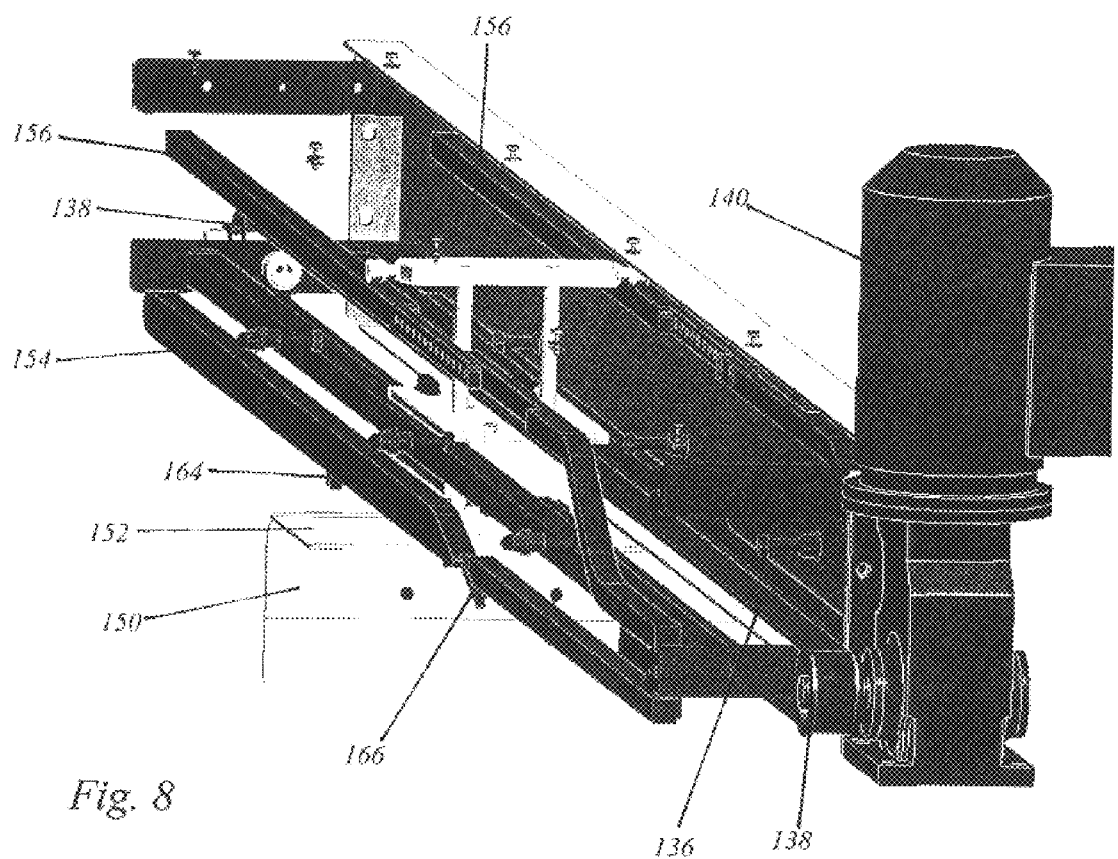
FIG. 8 is a rear perspective view of the apparatus of FIG. 7.
Figure 9:
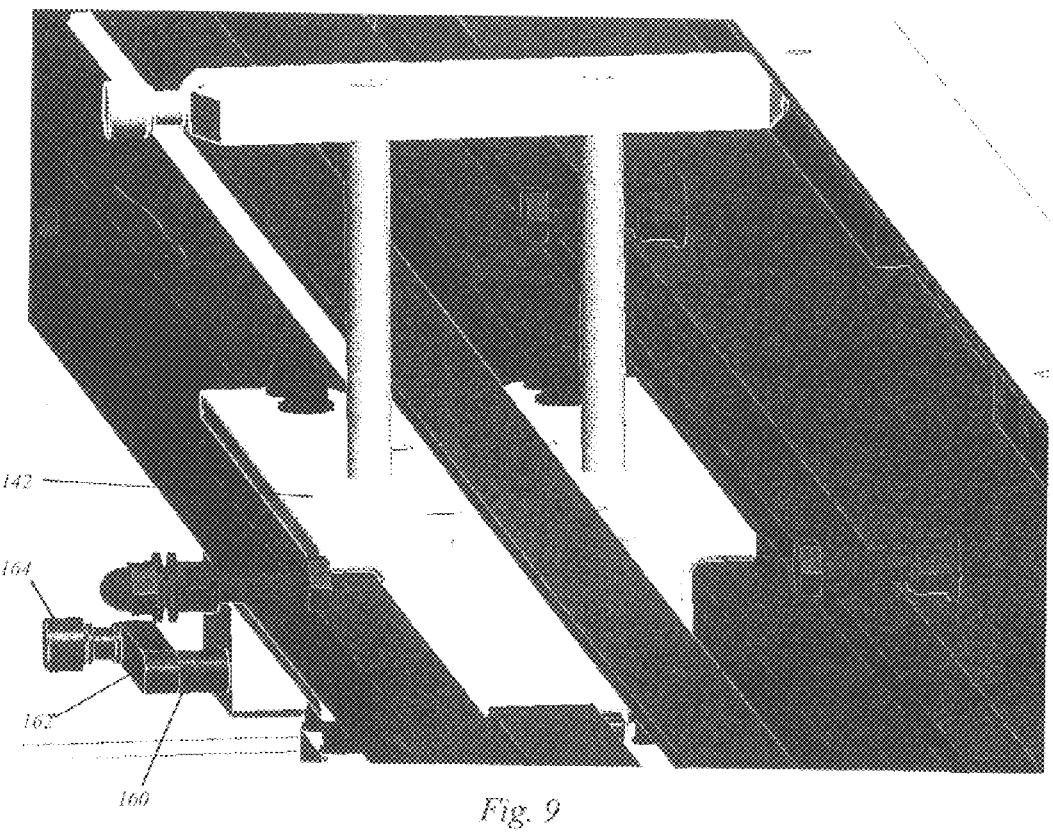
FIG. 9 is an enlargement of a portion of FIG. 8.
Figure 10:
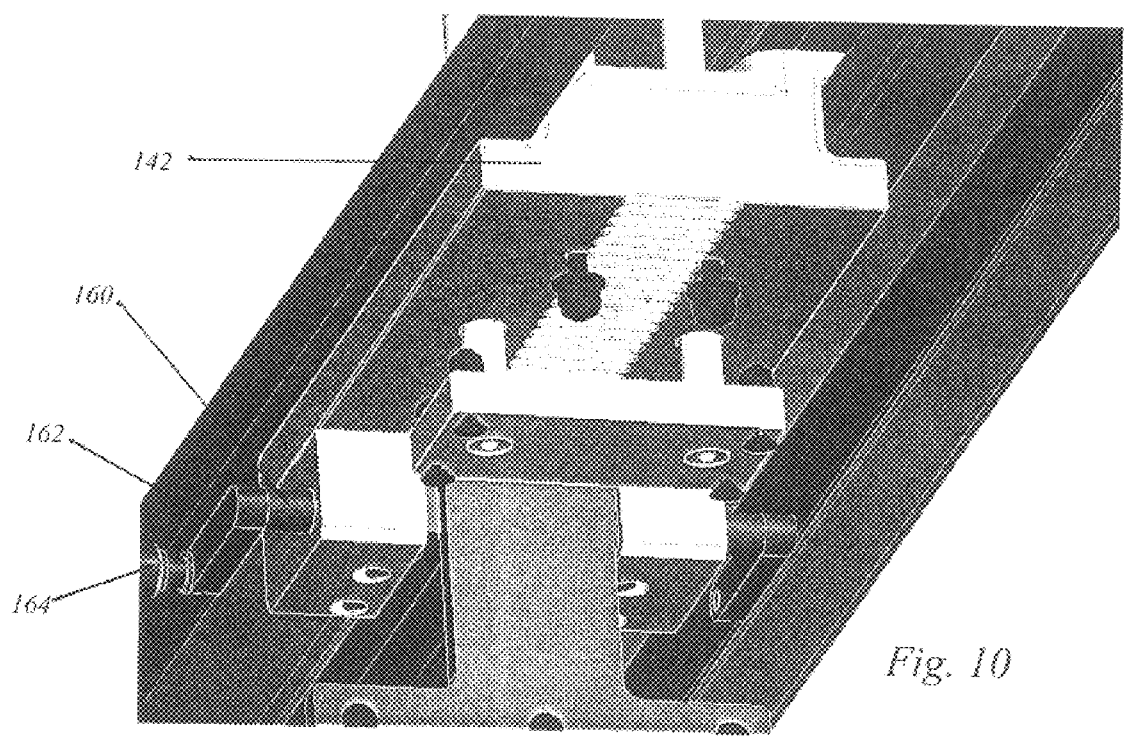
FIG. 10 is a bottom perspective view of a portion of the apparatus of FIG. 8.
Figure 11:
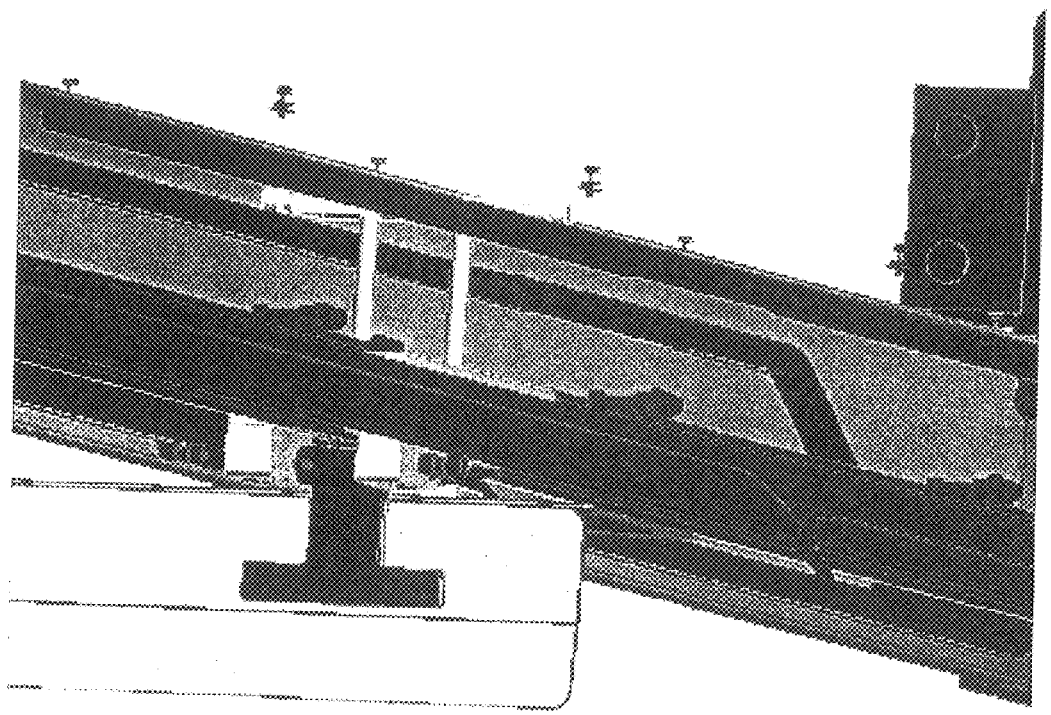
FIG. 11 is an enlargement of a portion of FIG. 7.

Referring particularly to FIGS. 3 and 4, the turntable 112 is driven by a motor 120. A pulley 122 is driven by the motor 120 and in turn drives a belt 124. The belt 124 extends entirely around the turntable 112 and functions to transfer operating power from the motor 120 to the turntable 112. The rotation of the vacuum turntable 112 is guided by a plurality of idler rollers 126 located at spaced intervals around the periphery of the turntable 112.

The use of the belt 124 to rotate the turntable 112 comprises an important feature of the invention. By means of the turntable drive system of the present invention, the high torque loads which are typically imposed on turntable drive shafts are eliminated. Perhaps more importantly, by eliminating the typical turntable drive shaft, the space directly beneath the turntable is made available for the vacuum generating apparatus 118 which applies vacuum to the turntable without interference from the turntable operating mechanism. In this manner, the vacuum is supplied uniformly across the entire diameter of the turntable 112.

The upper surface of the turntable 112 which engages the wrapped bakery products comprises a perforated plate 132. The diameter of the perforations comprising the plate 132 is preferably between about 0.0337 inches and about 0.0340 inches. The spacing between the holes comprising the perforated plate 132 is preferably between about 0.2186 inches and about 0.2225 inches. The thickness of the perforated plate 132 is preferably about 0.020 inches, however, thicker plates can also be used in the practice of the invention, if desired. Those skilled in the art will appreciate and understand the fact that the precise dimensions comprising the diameters of the perforations, the spacing between perforations, and the thickness of the perforated plate 132 of the vacuum turntable 112 can be varied in accordance with the requirements of particular applications of the invention.

The vacuum turntable 112 performs two very important functions in the operation of the pattern former 100. First, the vacuum turntable 112 decelerates individual wrapped bakery products comprising groups of wrapped bakery products which are moved onto the vacuum turntable 112 by the transfer apparatus 110. In this manner each wrapped bakery product comprising a group thereof is precisely positioned on the vacuum turntable 112 without danger of the wrapped bakery product moving beyond its intended location due to inertia. The vacuum turntable 112 also functions to firmly retain the wrapped bakery products received thereon during rotation of the vacuum turntable 112 to form the desired pattern of wrapped bakery products. This is true even if the wrapped bakery products are positioned near the outer circumference of the vacuum turntable 112. Perhaps most importantly, the vacuum turntable 112 properly decelerates wrapped bakery products received thereon and subsequently firmly retains the wrapped bakery products during rotation with no damage to the bakery products or the wrapping thereof.

FIGS. 5–11, inclusive, illustrate the construction and operation of the apparatus 116 which transfers patterns of wrapped bakery products from the vacuum turntable 112 to bakery trays for transportation from the bakery to retail outlets. The apparatus 116 includes a housing 134 which encloses a drive belt 136. The drive belt 136 moves along a course defined by pulleys 138 and is driven by a motor 140. A traveler 142 is secured to the belt 136 for movement thereby along a substantially horizontal course defined by slideways 144. The slideways 144 support the traveler 142 for movement under the action of the belt 136.

The traveler 142 supports a pusher plate 150 and a spanker plate 152. The pusher plate 150 is actuated by pusher plate cams 154 and the spanker plate 152 is actuated by spanker plate cams 156.

As is best shown in FIGS. 8, 9, 10, and 11, the pusher plate 150 is supported on a rod 160 which is pivotally supported on the traveler 142. A bell crank 162 extends from each end of the rod 160, and a cam follower 164 is supported at the distal end of each bell crank 162. The weight of the pusher plate 150 normally pivots the pusher plate 150 downwardly thereby pivoting the cam followers 164 upwardly and into engagement with camming surfaces comprising the lower surfaces of the pusher plate cams 154.

The pusher plate cams 154 include pivotally supported sections 166. As the pusher plate 150 moves away from the turntable 112 and toward the motor 140, the cam followers 164 engage the pivotally supported portions 166 which thereupon pivot upwardly allowing the cam followers 164 to continue in engagement with the lower camming surfaces of the pusher plate cams 154.

When the pusher plate 150 reaches the end of its travel away from the turntable 112 and toward the motor 140, the direction of movement of the belt 136 is reversed and the pusher plate 150 is moved in the opposite direction, i.e., away from the motor 140 and toward the turntable 112. The cam followers 164 engage the pivotally supported portions 166 of the pusher plate cams 154 thereby causing the cam followers 164 to ride upwardly and into engagement with upper camming surfaces comprising the pusher plate cams 154. Engagement of the cam followers 164 with the upper camming surfaces of the pusher plate cams 154 pivots the pusher plate 150 upwardly into an orientation in which it extends parallel to the pusher plate cams 154. This allows the pusher plate 150 to pass over a pattern of wrapped baked goods which has been assembled on the vacuum turntable 112 as the pusher plate 150 was moving a previously assembled pattern off the turntable 112 and into a bakery tray.

The spanker plate 152 is supported on rods 172 which are sidedly supported in the traveler 142. The rods 172 extend to a bar 174 which in turn extends to cam followers 176 which engage the spanker plate cams 156. As will be appreciated by those skilled in the art, the spanker plate cams 156 allow the spanker plate 152 to move downwardly as the traveler 142 reaches the limit of its travel in the direction extending away from the vacuum turntable 112 and towards the motor 140. As the traveler 142 begins its reverse movement, i.e., away from the motor 140 and toward the vacuum turntable 112, the spanker plate cams 156 return the spanker plate 152 to the position illustrated in FIGS. 5–11, inclusive.

Figure 12:
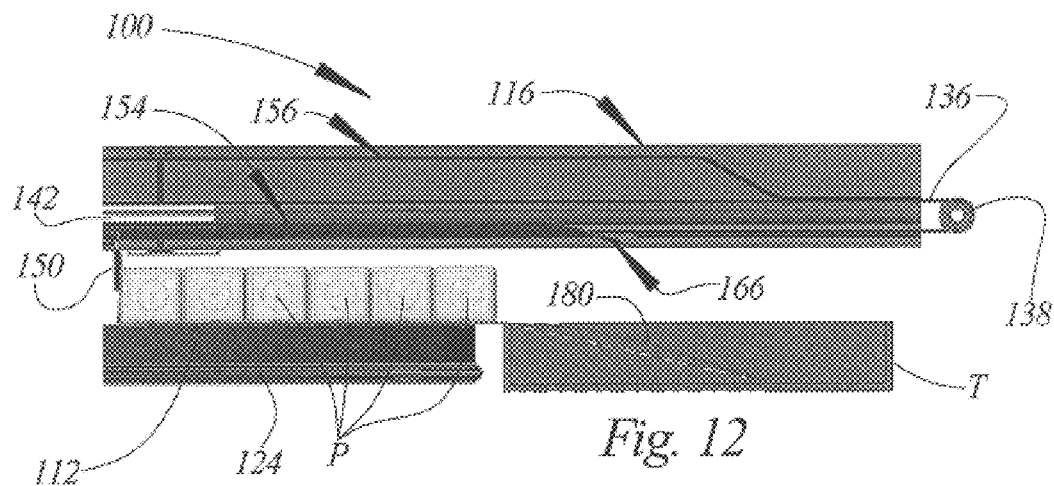
FIG. 12 is an illustration of an initial step in the operation of the apparatus shown in FIGS. 5–11.
Figure 13:
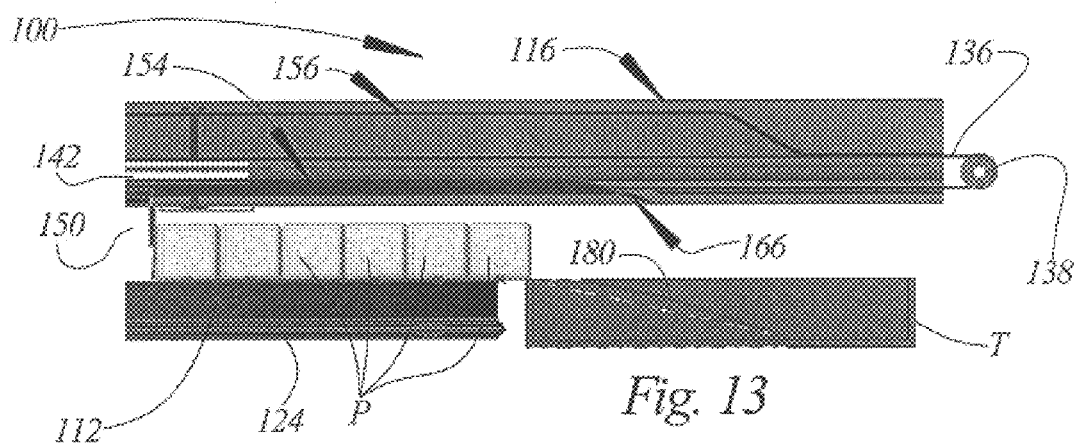
FIG. 13 is an illustration of a subsequent step in the operation of the apparatus shown in FIGS. 5–11.
Figure 14:
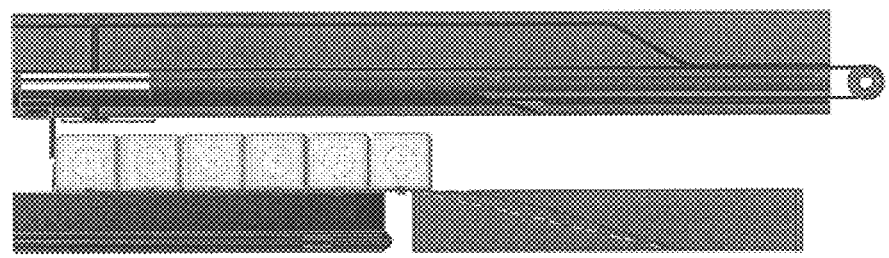
FIG. 14 is an illustration of a subsequent step in the operation of the apparatus shown in FIGS. 5–11.
Figure 15:
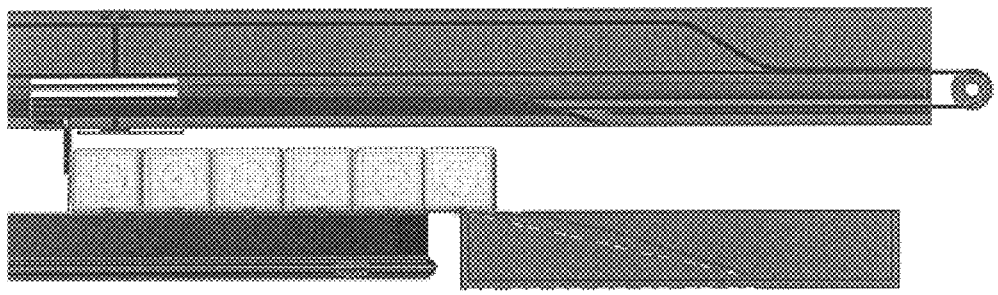
FIG. 15 is an illustration of a subsequent step in the operation of the apparatus shown in FIGS. 5–11.
Figure 16:
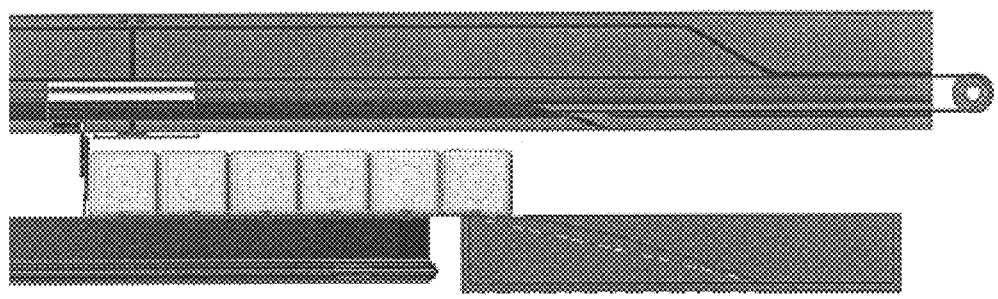
FIG. 16 is an illustration of a subsequent step in the operation of the apparatus shown in FIGS. 5–11.
Figure 17:
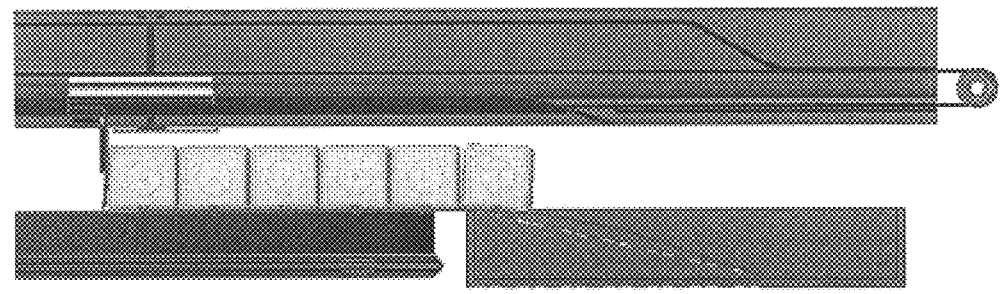
FIG. 17 is an illustration of a subsequent step in the operation of the apparatus shown in FIGS. 5–11.
Figure 18:
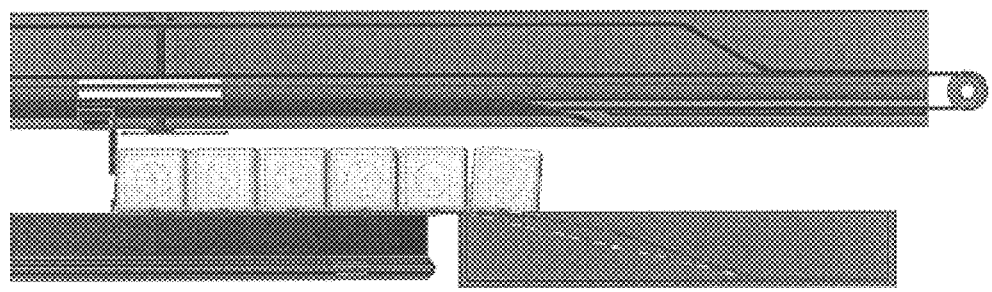
FIG. 18 is an illustration of a subsequent step in the operation of the apparatus shown in FIGS. 5–11.
Figure 19:
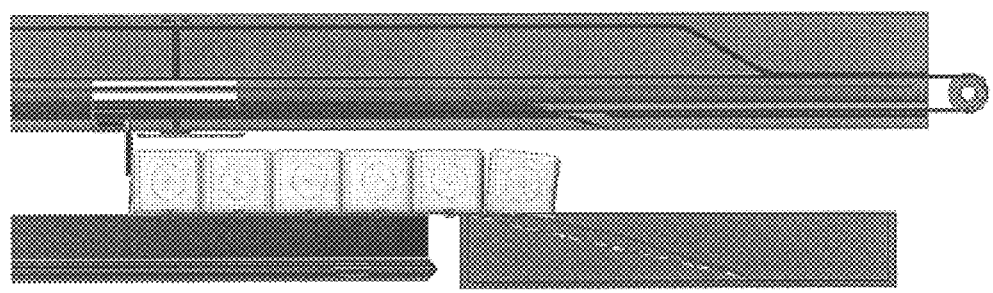
FIG. 19 is an illustration of a subsequent step in the operation of the apparatus shown in FIGS. 5–11.
Figure 20:
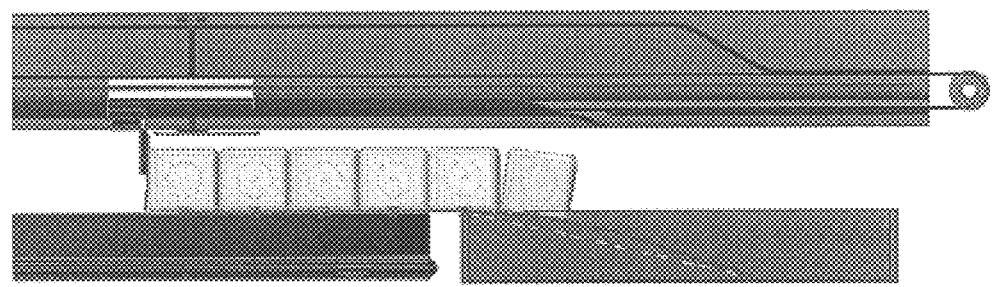
FIG. 20 is an illustration of a subsequent step in the operation of the apparatus shown in FIGS. 5–11.
Figure 21:
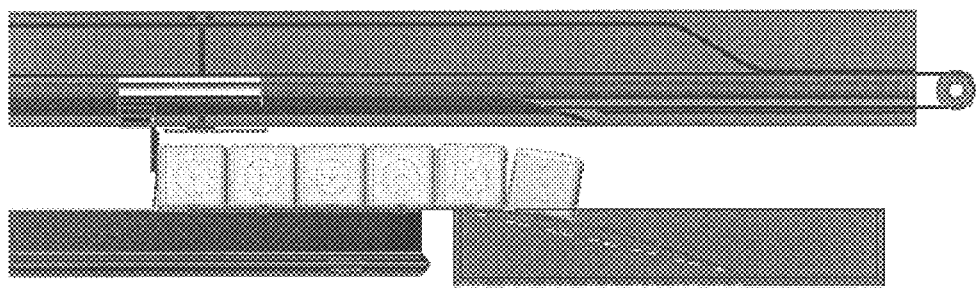
FIG. 21 is an illustration of a subsequent step in the operation of the apparatus shown in FIGS. 5–11.
Figure 22:
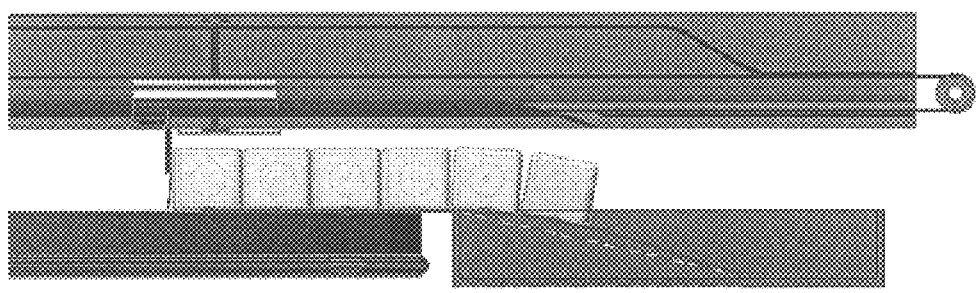
FIG. 22 is an illustration of a subsequent step in the operation of the apparatus shown in FIGS. 5–11.
Figure 23:
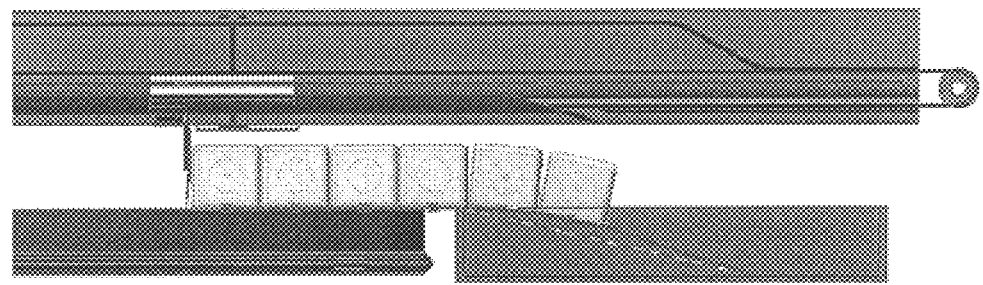
FIG. 23 is an illustration of a subsequent step in the operation of the apparatus shown in FIGS. 5–11.
Figure 24:
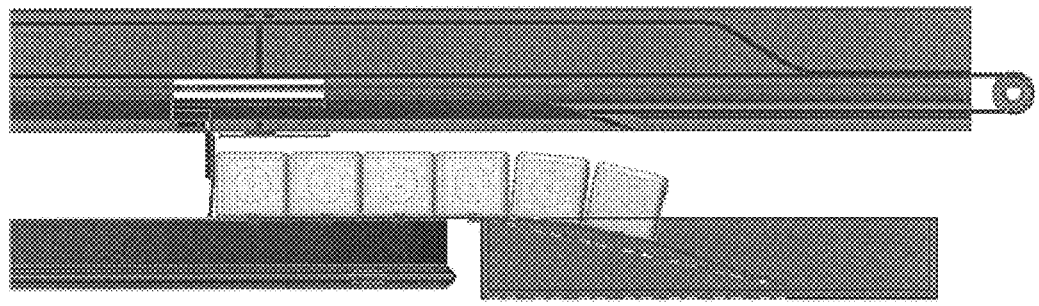
FIG. 24 is an illustration of a subsequent step in the operation of the apparatus shown in FIGS. 5–11.
Figure 25:
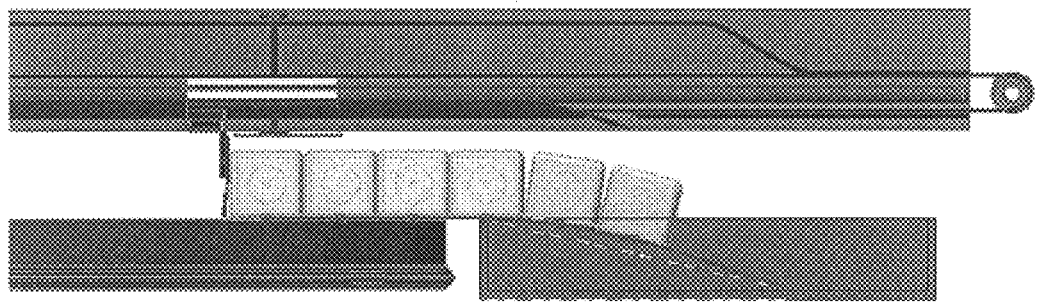
FIG. 25 is an illustration of a subsequent step in the operation of the apparatus shown in FIGS. 5–11.
Figure 26:
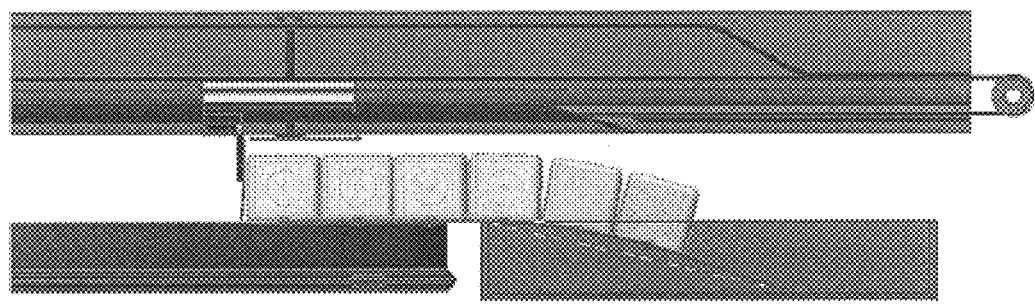
FIG. 26 is an illustration of a subsequent step in the operation of the apparatus shown in FIGS. 5–11.
Figure 27:
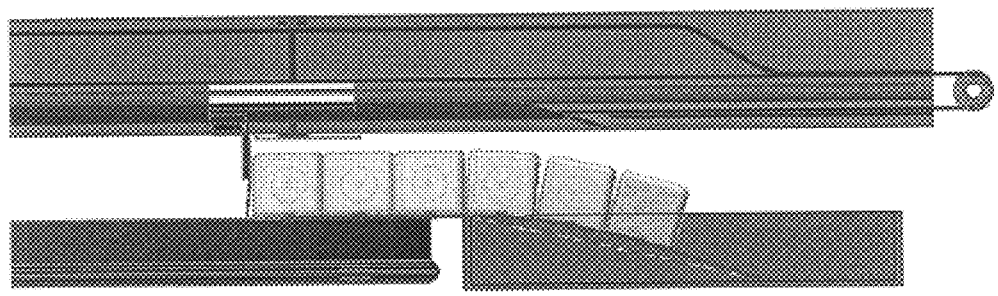
FIG. 27 is an illustration of a subsequent step in the operation of the apparatus shown in FIGS. 5–11.
Figure 28:
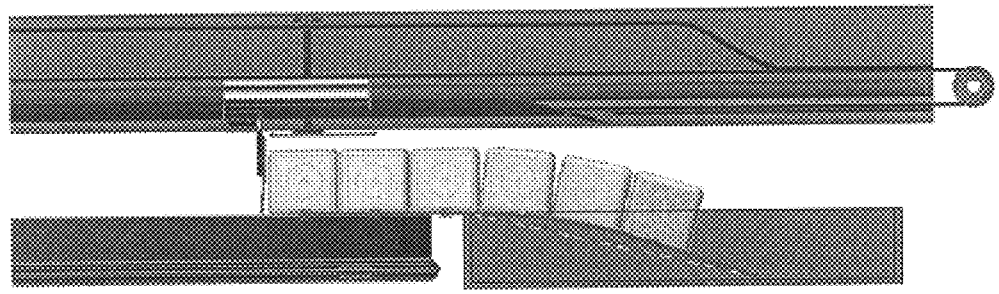
FIG. 28 is an illustration of a subsequent step in the operation of the apparatus shown in FIGS. 5–11.
Figure 29:
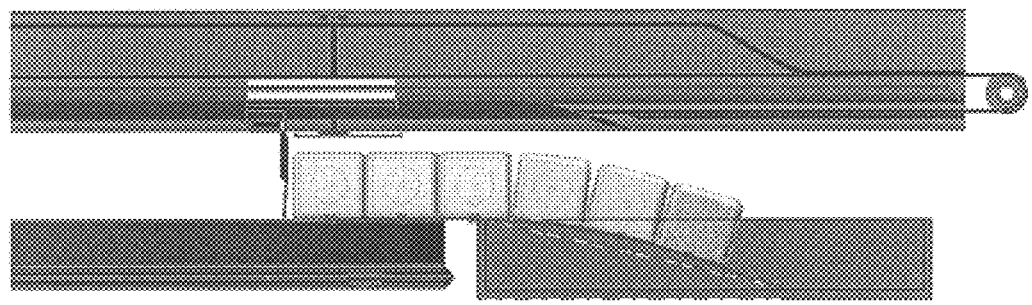
FIG. 29 is an illustration of a subsequent step in the operation of the apparatus shown in FIGS. 5–11.
Figure 30:
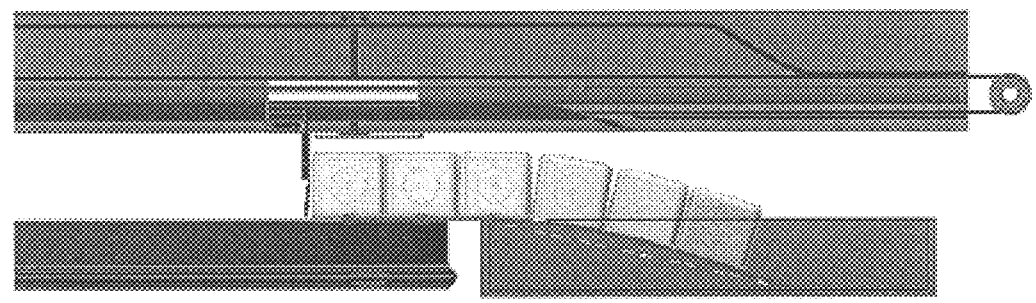
FIG. 30 is an illustration of a subsequent step in the operation of the apparatus shown in FIGS. 5–11.
Figure 31:
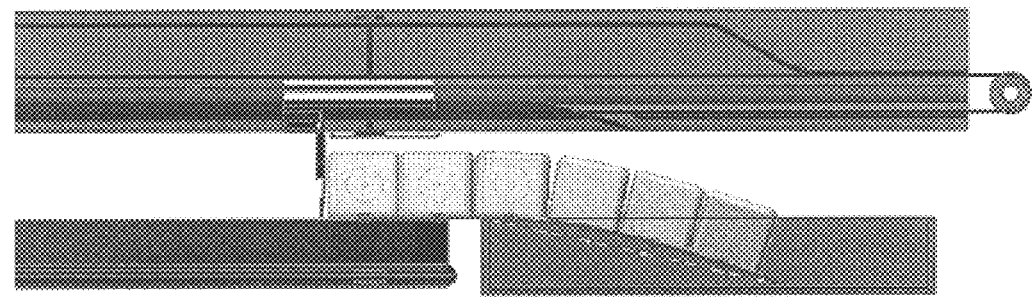
FIG. 31 is an illustration of a subsequent step in the operation of the apparatus shown in FIGS. 5–11.
Figure 32:
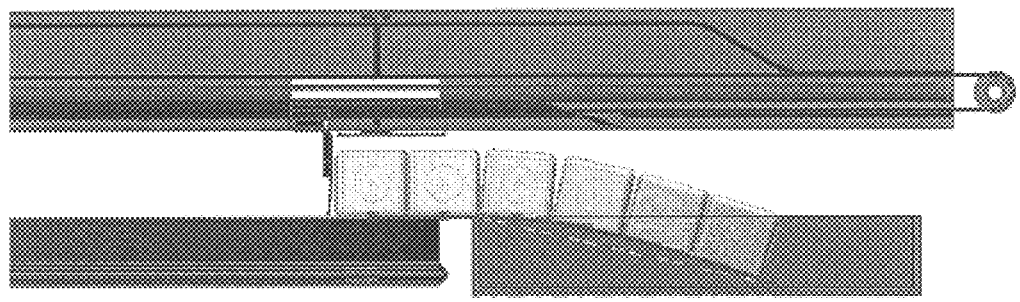
FIG. 32 is an illustration of a subsequent step in the operation of the apparatus shown in FIGS. 5–11.
Figure 33:
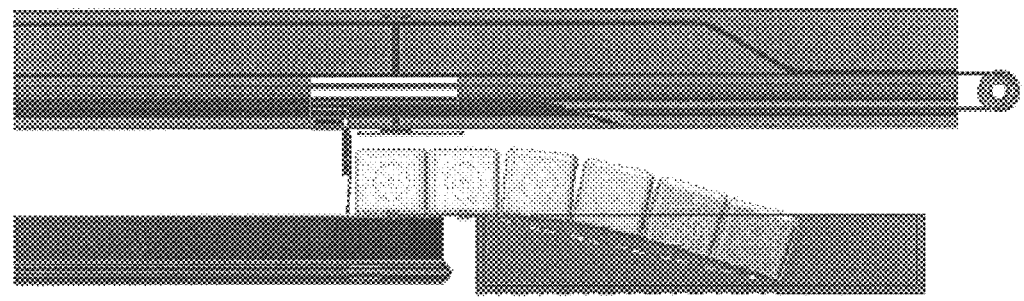
FIG. 33 is an illustration of a subsequent step in the operation of the apparatus shown in FIGS. 5–11.
Figure 34:
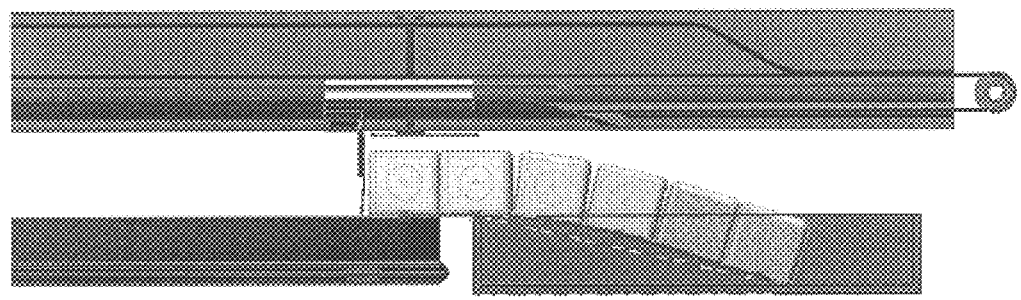
FIG. 34 is an illustration of a subsequent step in the operation of the apparatus shown in FIGS. 5–11.
Figure 35:
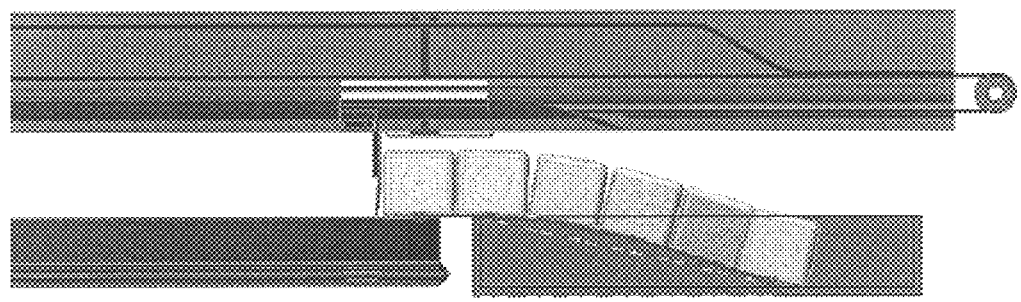
FIG. 35 is an illustration of a subsequent step in the operation of the apparatus shown in FIGS. 5–11.
Figure 36:
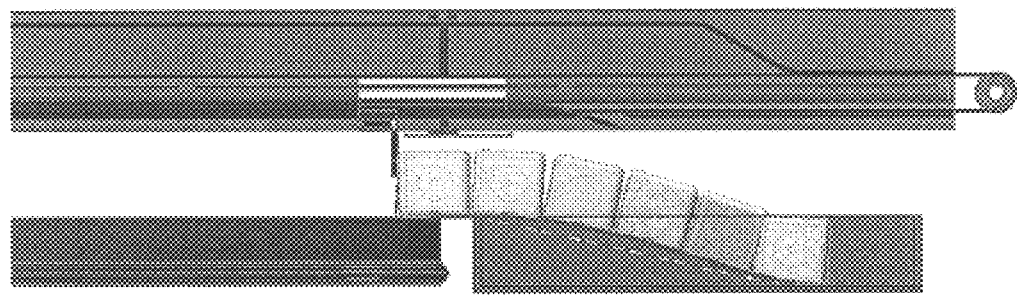
FIG. 36 is an illustration of a subsequent step in the operation of the apparatus shown in FIGS. 5–11.
Figure 37:
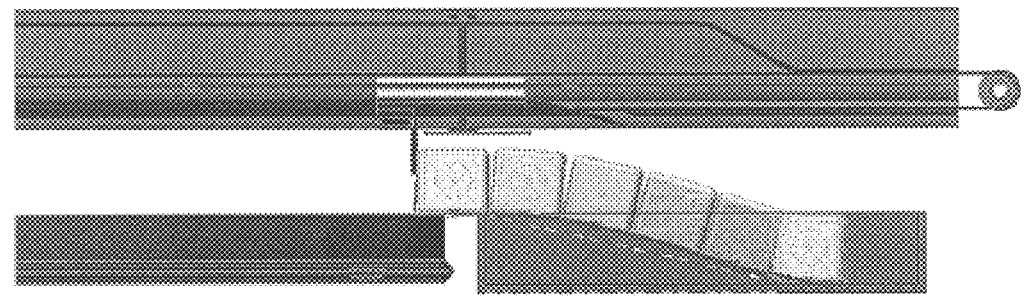
FIG. 37 is an illustration of a subsequent step in the operation of the apparatus shown in FIGS. 5–11.
Figure 38:
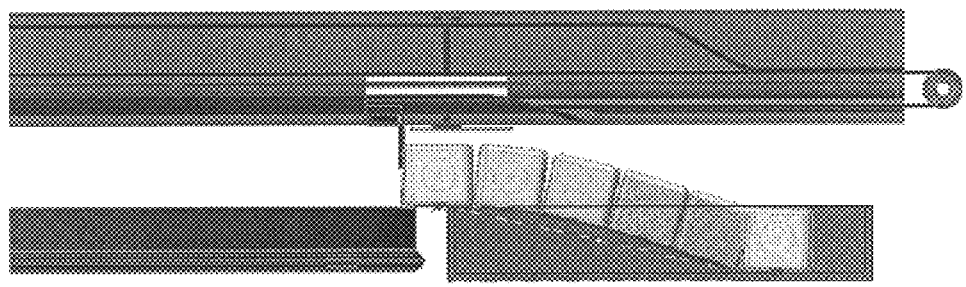
FIG. 38 is an illustration of a subsequent step in the operation of the apparatus shown in FIGS. 5–11.
Figure 39:
FIG. 39 is an illustration of a subsequent step in the operation of the apparatus shown in FIGS. 5–11.
Figure 40:
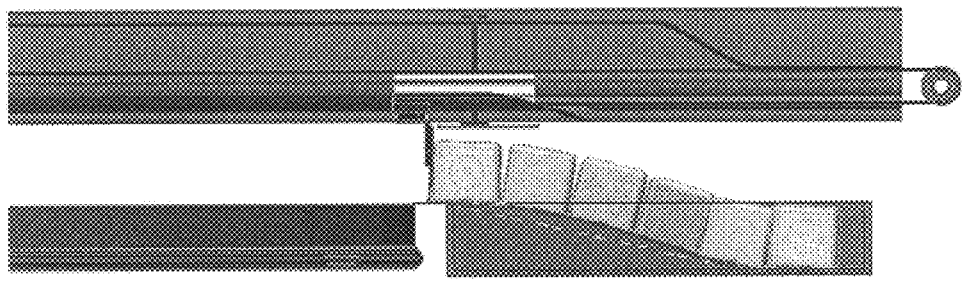
FIG. 40 is an illustration of a subsequent step in the operation of the apparatus shown in FIGS. 5–11.
Figure 41:
FIG. 41 is an illustration of a subsequent step in the operation of the apparatus shown in FIGS. 5–11.
Figure 42:
FIG. 42 is an illustration of a subsequent step in the operation of the apparatus shown in FIGS. 5–11.
Figure 43:
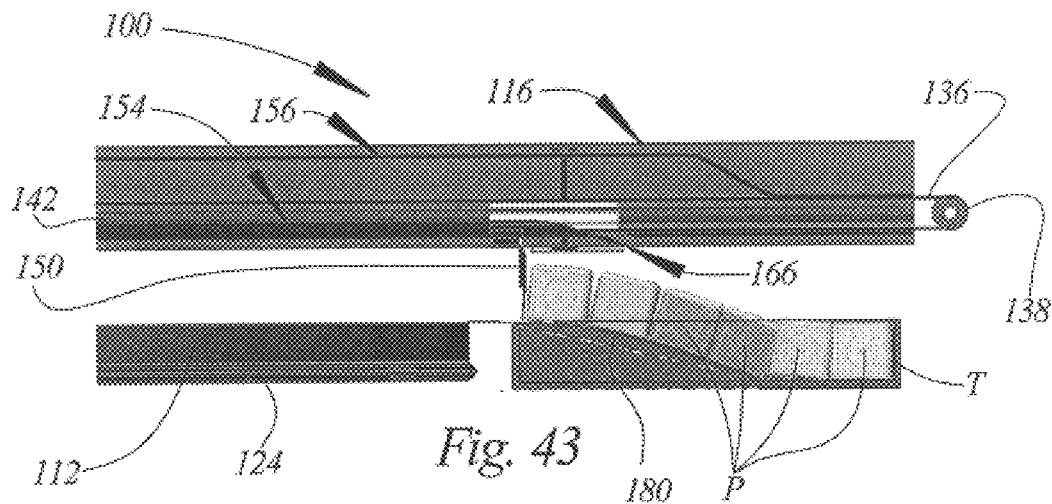
FIG. 43 is an illustration of a subsequent step in the operation of the apparatus shown in FIGS. 5–11.
Figure 44:
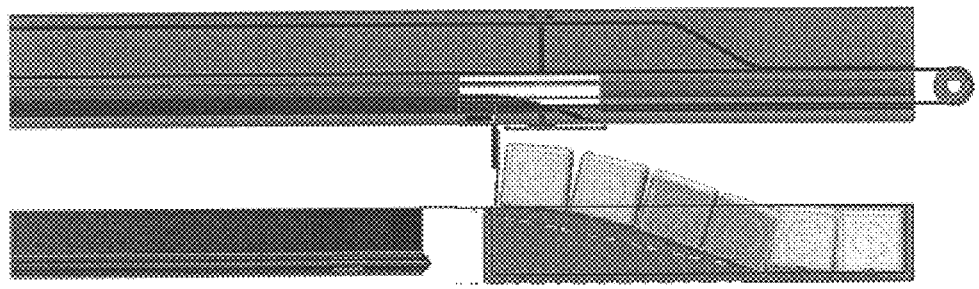
FIG. 44 is an illustration of a subsequent step in the operation of the apparatus shown in FIGS. 5–11.
Figure 45:
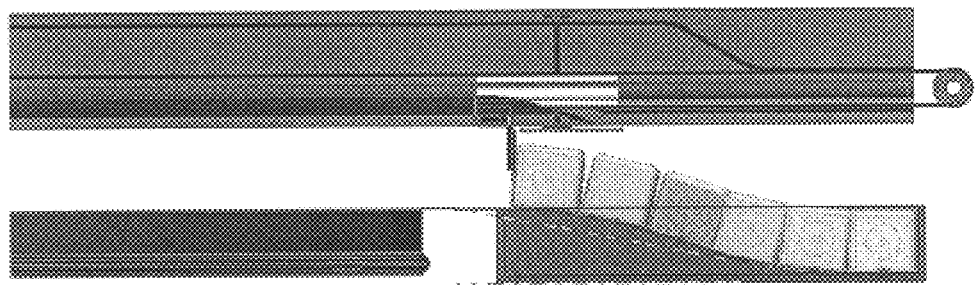
FIG. 45 is an illustration of a subsequent step in the operation of the apparatus shown in FIGS. 5–11.
Figure 46:
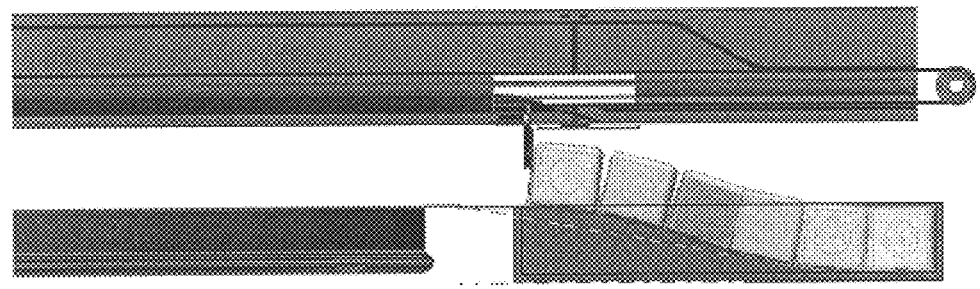
FIG. 46 is an illustration of a subsequent step in the operation of the apparatus shown in FIGS. 5–11.
Figure 47:
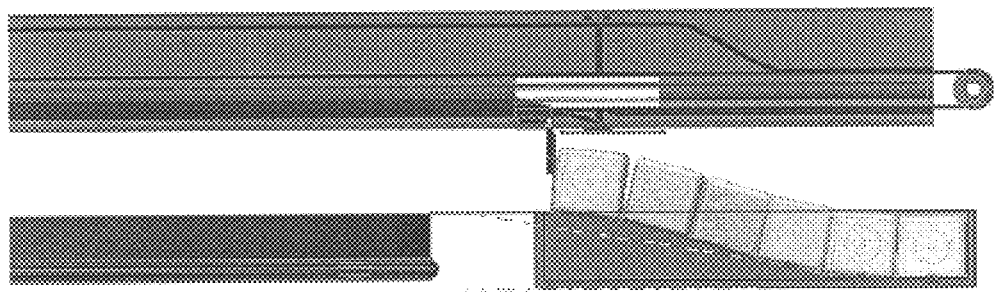
FIG. 47 is an illustration of a subsequent step in the operation of the apparatus shown in FIGS. 5–11.
Figure 48:
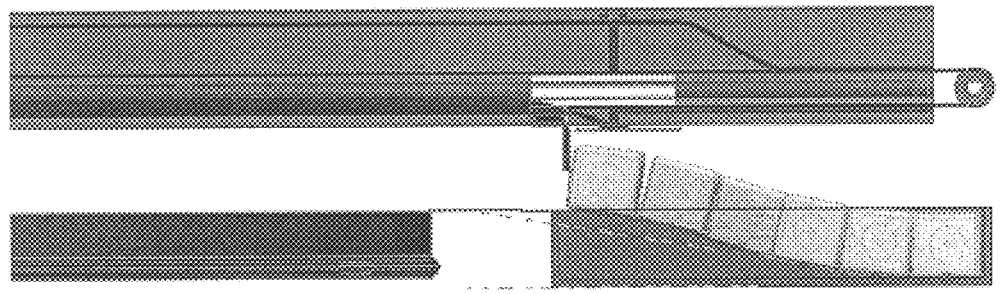
FIG. 48 is an illustration of a subsequent step in the operation of the apparatus shown in FIGS. 5–11.
Figure 49:
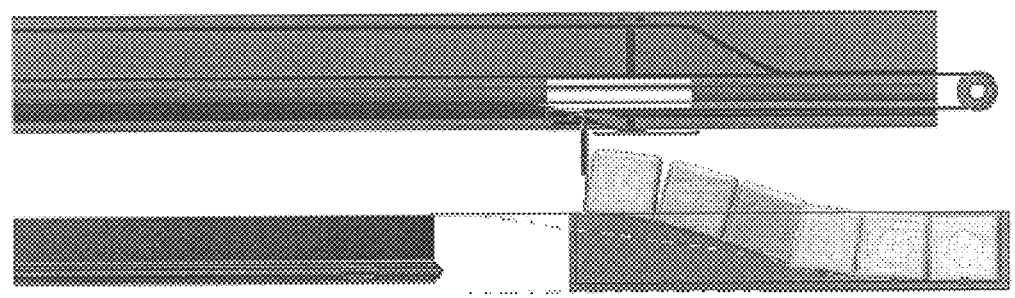
FIG. 49 is an illustration of a subsequent step in the operation of the apparatus shown in FIGS. 5–11.
Figure 50:
FIG. 50 is an illustration of a subsequent step in the operation of the apparatus shown in FIGS. 5–11.
Figure 51:
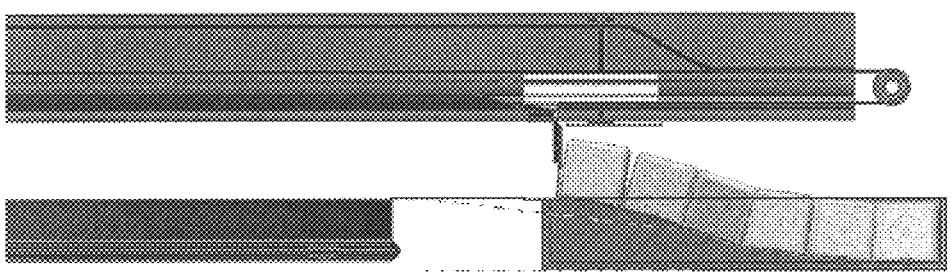
FIG. 51 is an illustration of a subsequent step in the operation of the apparatus shown in FIGS. 5–11.
Figure 52:
FIG. 52 is an illustration of a subsequent step in the operation of the apparatus shown in FIGS. 5–11.
Figure 53:
FIG. 53 is an illustration of a subsequent step in the operation of the apparatus shown in FIGS. 5–11.
Figure 54:
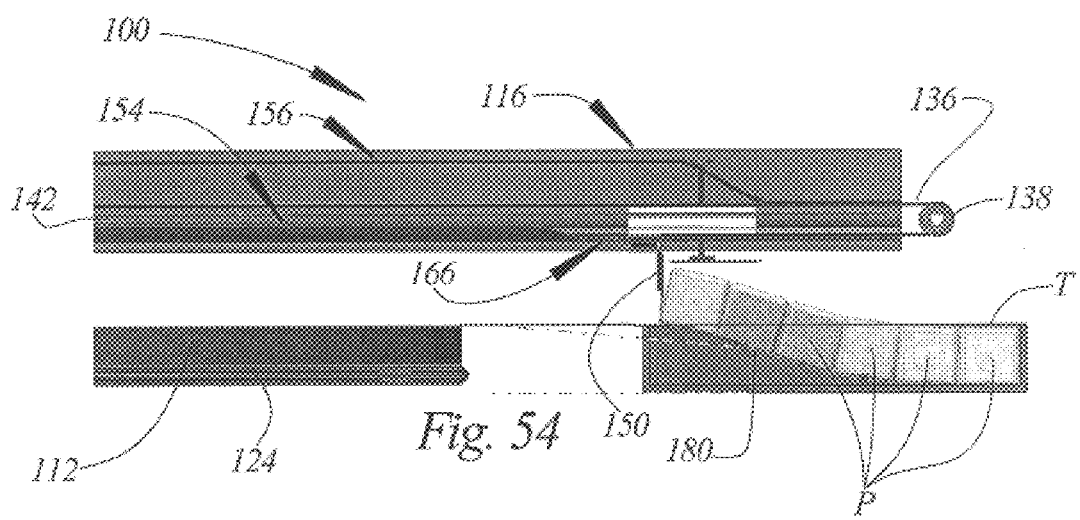
FIG. 54 is an illustration of a subsequent step in the operation of the apparatus shown in FIGS. 5–11.
Figure 55:
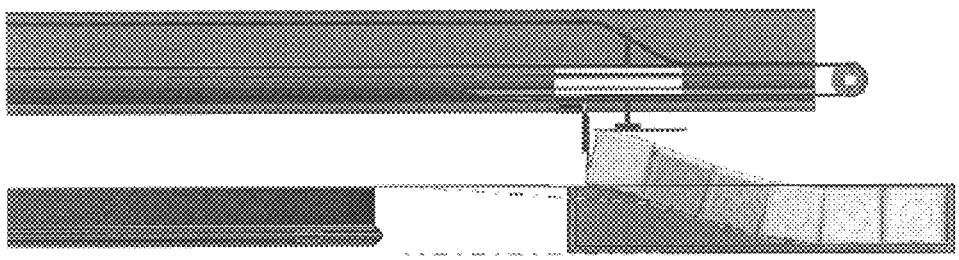
FIG. 55 is an illustration of a subsequent step in the operation of the apparatus shown in FIGS. 5–11.
Figure 56:
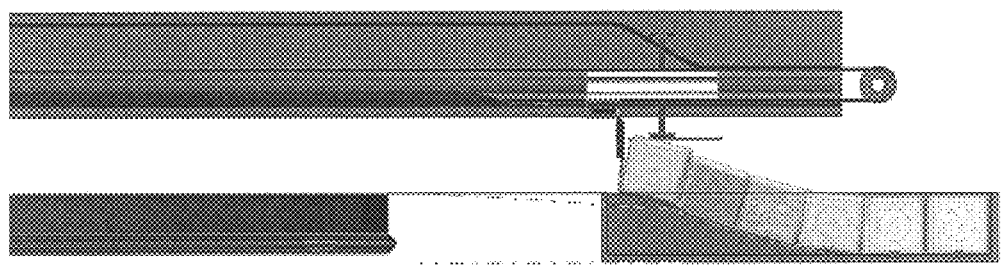
FIG. 56 is an illustration of a subsequent step in the operation of the apparatus shown in FIGS. 5–11.
Figure 57:
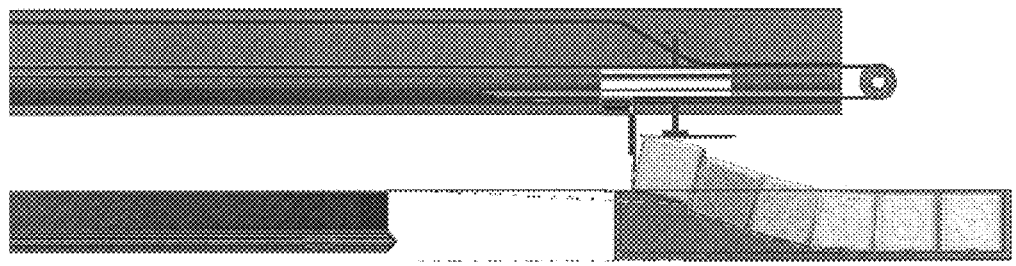
FIG. 57 is an illustration of a subsequent step in the operation of the apparatus shown in FIGS. 5–11.
Figure 58:
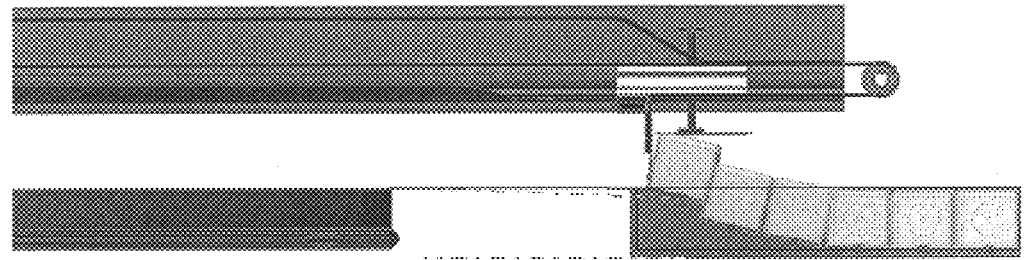
FIG. 58 is an illustration of a subsequent step in the operation of the apparatus shown in FIGS. 5–11.
Figure 59:
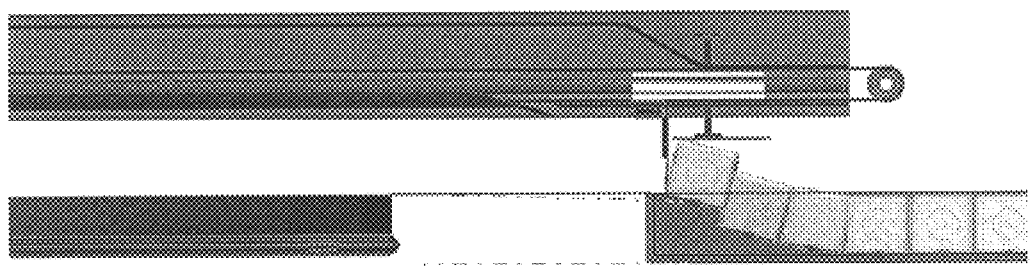
FIG. 59 is an illustration of a subsequent step in the operation of the apparatus shown in FIGS. 5–11.
Figure 60:
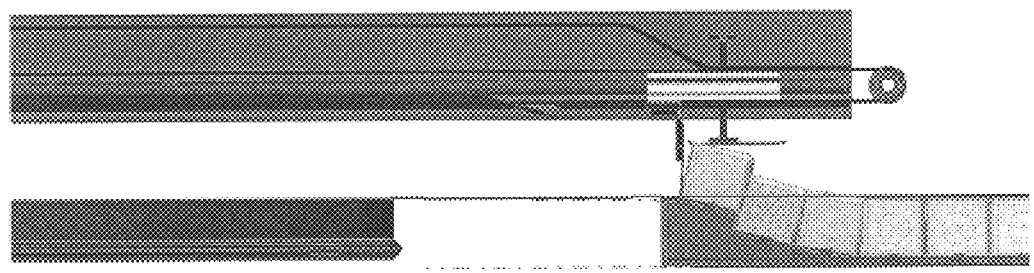
FIG. 60 is an illustration of a subsequent step in the operation of the apparatus shown in FIGS. 5–11.
Figure 61:
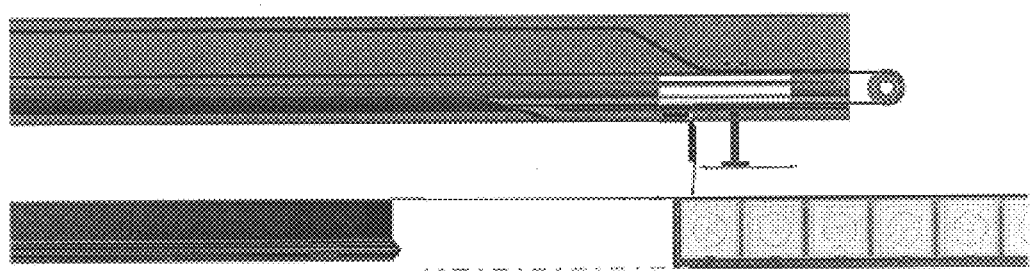
FIG. 61 is an illustration of a subsequent step in the operation of the apparatus shown in FIGS. 5–11.
Figure 62:
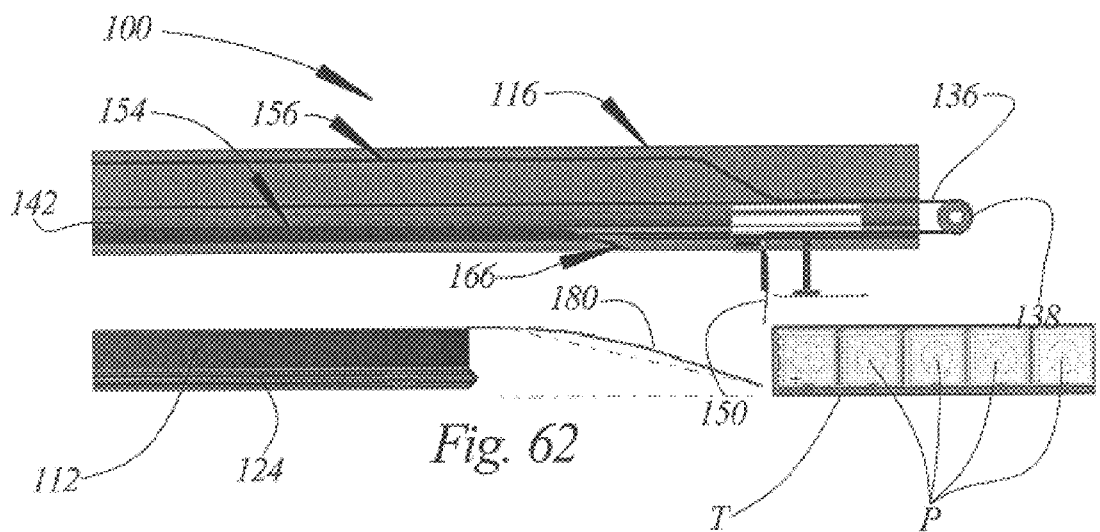
FIG. 62 is an illustration of a subsequent step in the operation of the apparatus shown in FIGS. 5–11.
Figure 63:
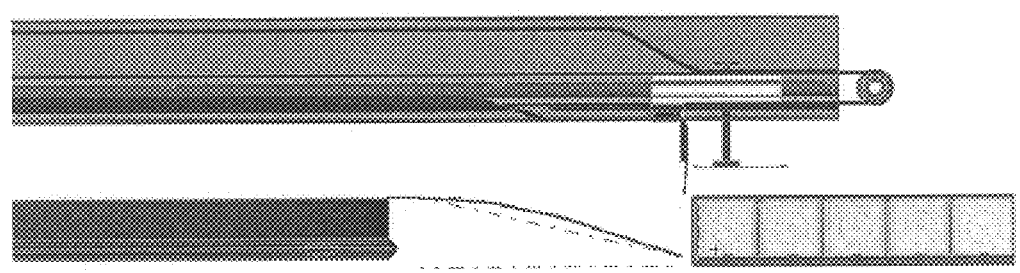
FIG. 63 is an illustration of a subsequent step in the operation of the apparatus shown in FIGS. 5–11.
Figure 64:
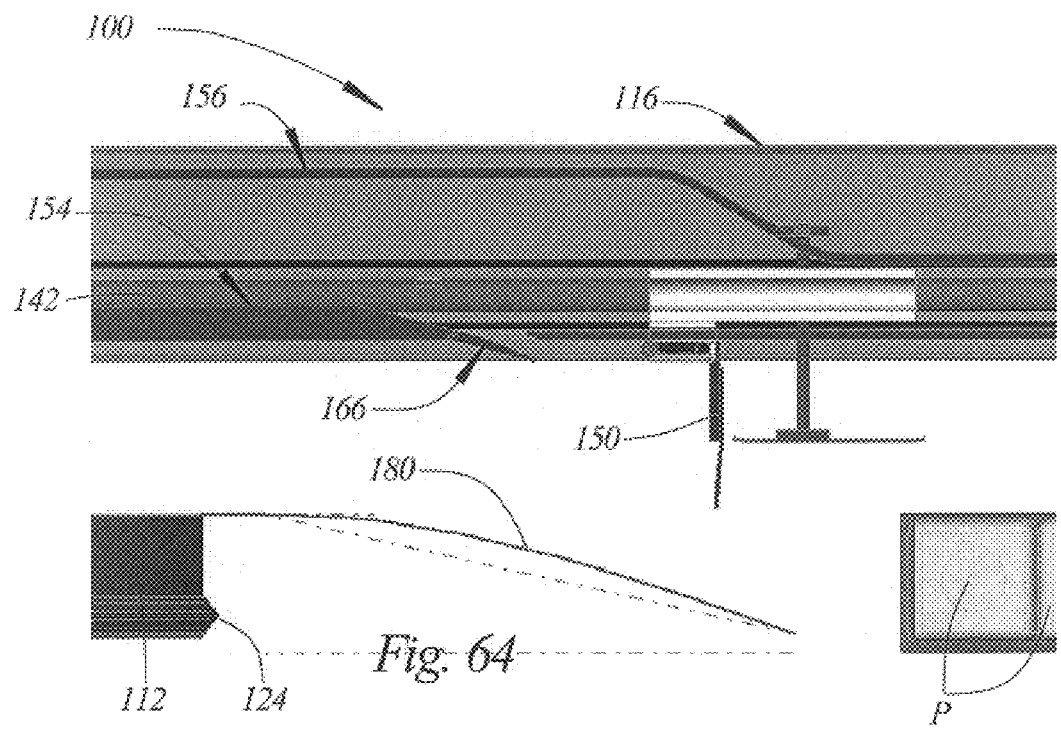
FIG. 64 is an illustration of a subsequent step in the operation of the apparatus shown in FIGS. 5–11.
Figure 65:
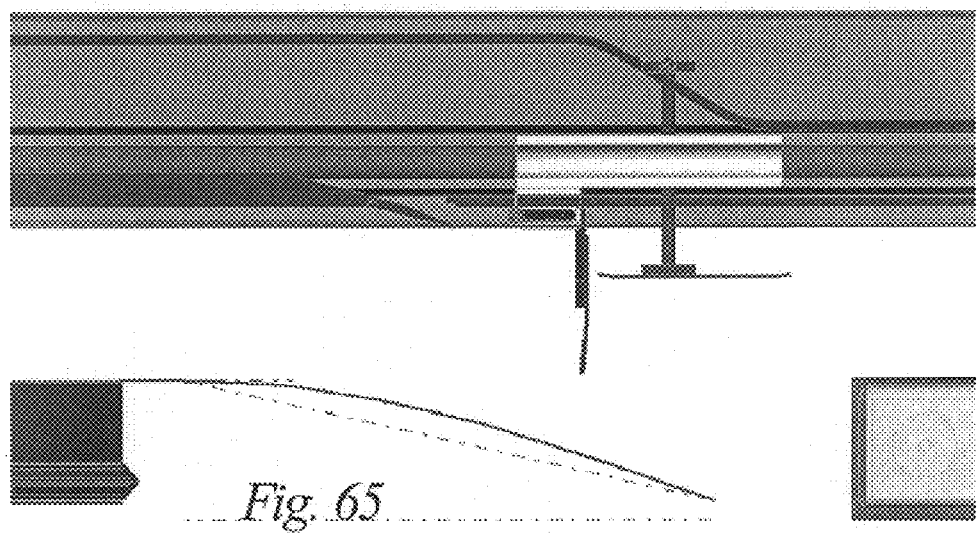
FIG. 65 is an illustration of a subsequent step in the operation of the apparatus shown in FIGS. 5–11.
Figure 66:
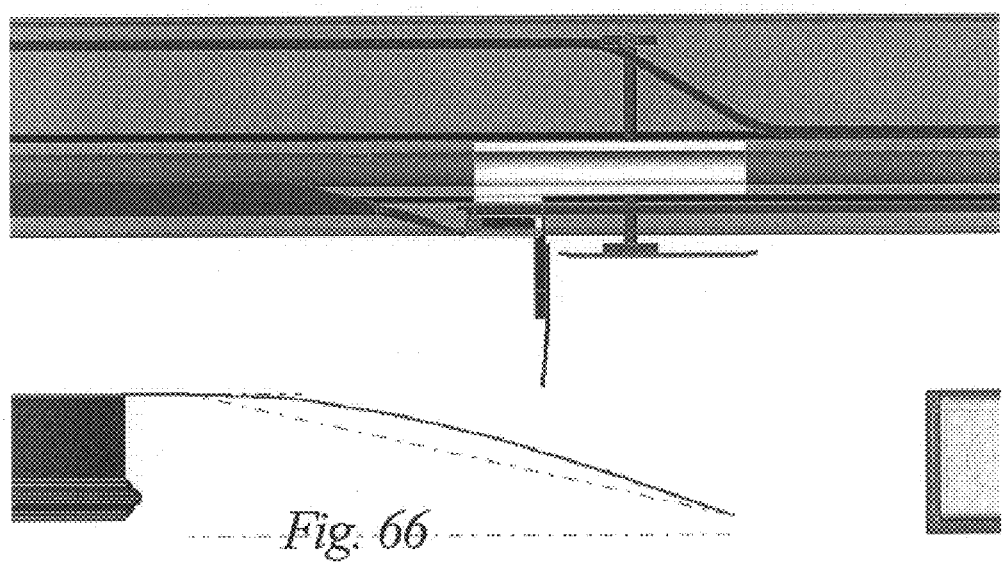
FIG. 66 is an illustration of a subsequent step in the operation of the apparatus shown in FIGS. 5–11.
Figure 67:
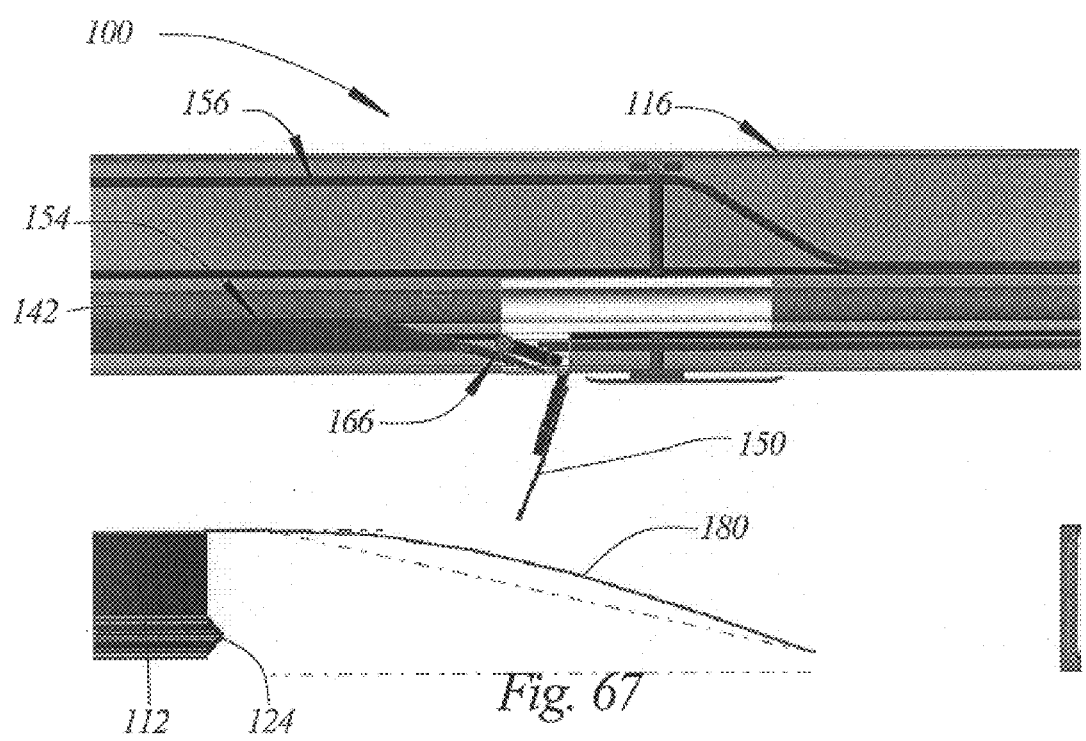
FIG. 67 is an illustration of a subsequent step in the operation of the apparatus shown in FIGS. 5–11.
Figure 68:
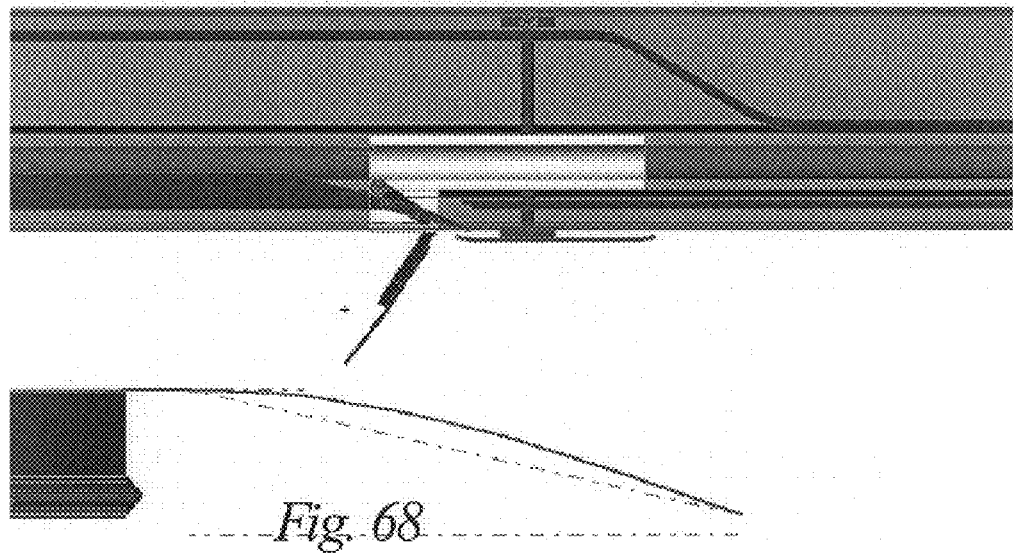
FIG. 68 is an illustration of a subsequent step in the operation of the apparatus shown in FIGS. 5–11.
Figure 69:
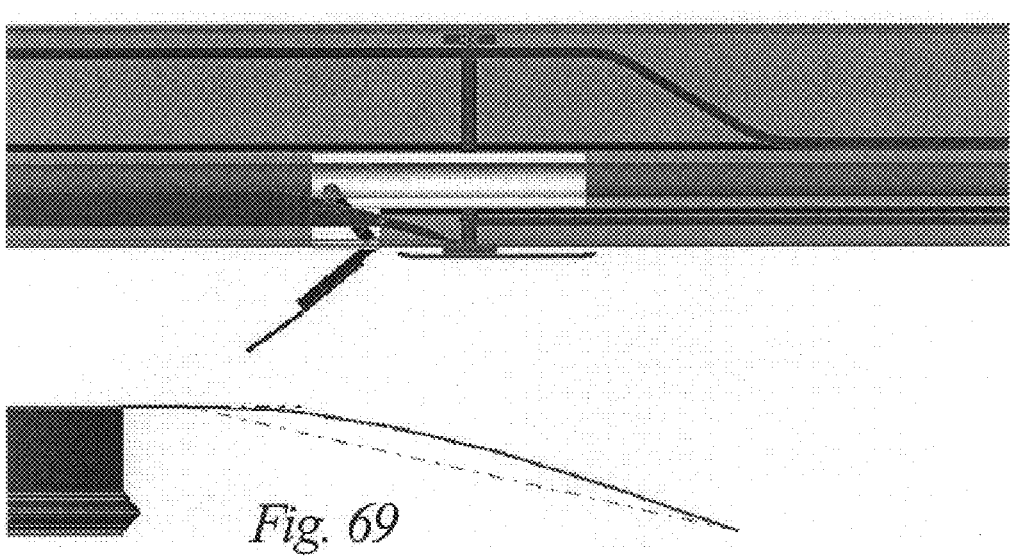
FIG. 69 is an illustration of a subsequent step in the operation of the apparatus shown in FIGS. 5–11.
Figure 70:
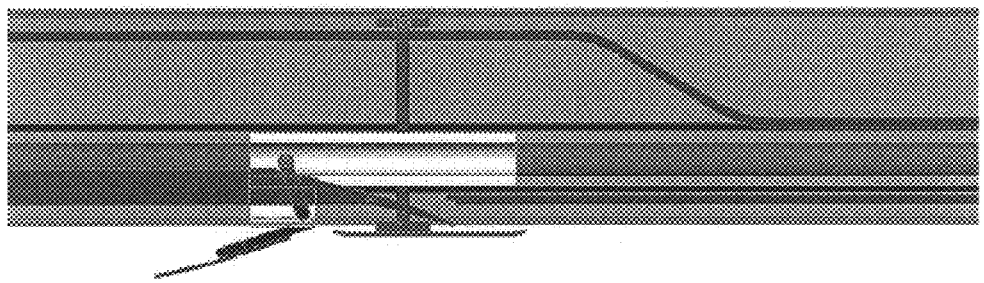
FIG. 70 is an illustration of a subsequent step in the operation of the apparatus shown in FIGS. 5–11.
Figure 71:
FIG. 71 is an illustration of a subsequent step in the operation of the apparatus shown in FIGS. 5–11.
Figure 72:
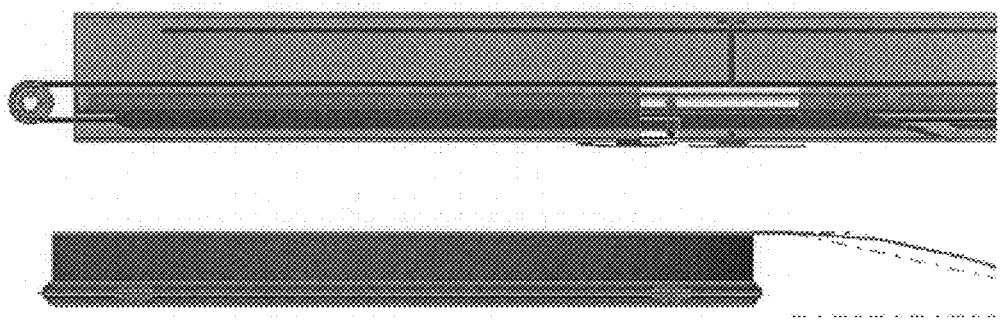
FIG. 72 is an illustration of a subsequent step in the operation of the apparatus shown in FIGS. 5–11.
Figure 73:
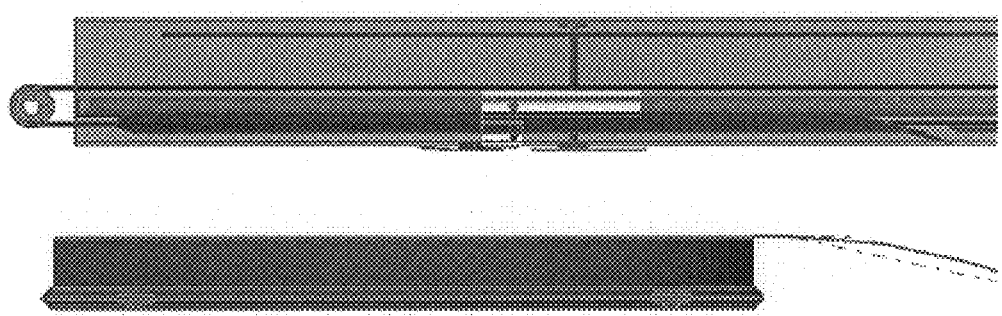
FIG. 73 is an illustration of a subsequent step in the operation of the apparatus shown in FIGS. 5–11.
Figure 74:
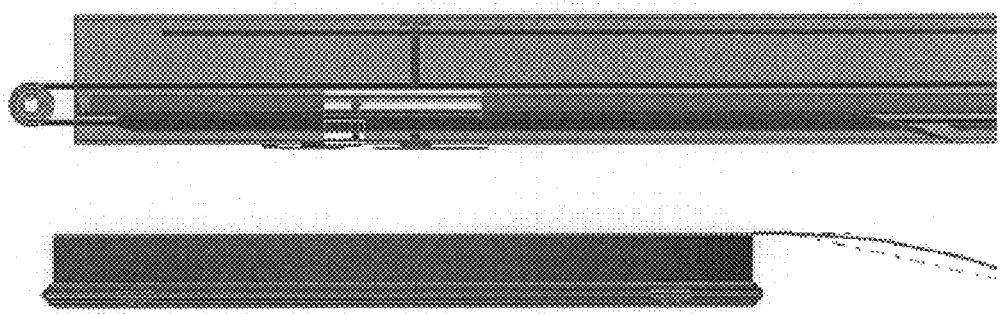
FIG. 74 is an illustration of a subsequent step in the operation of the apparatus shown in FIGS. 5–11.
Figure 75:
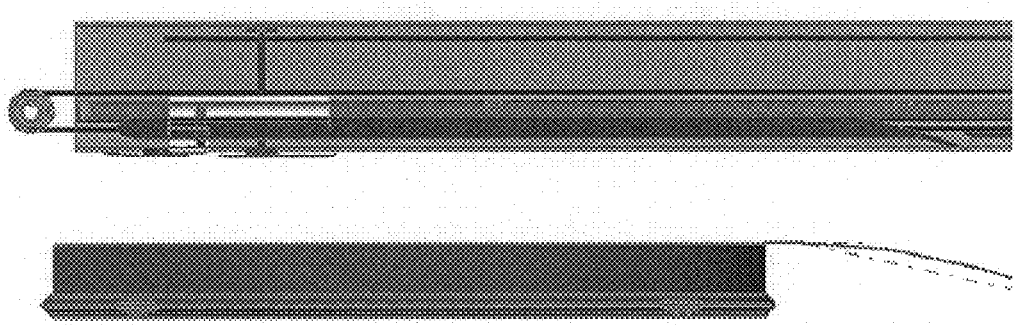
FIG. 75 is an illustration of a subsequent step in the operation of the apparatus shown in FIGS. 5–11.
Figure 76:
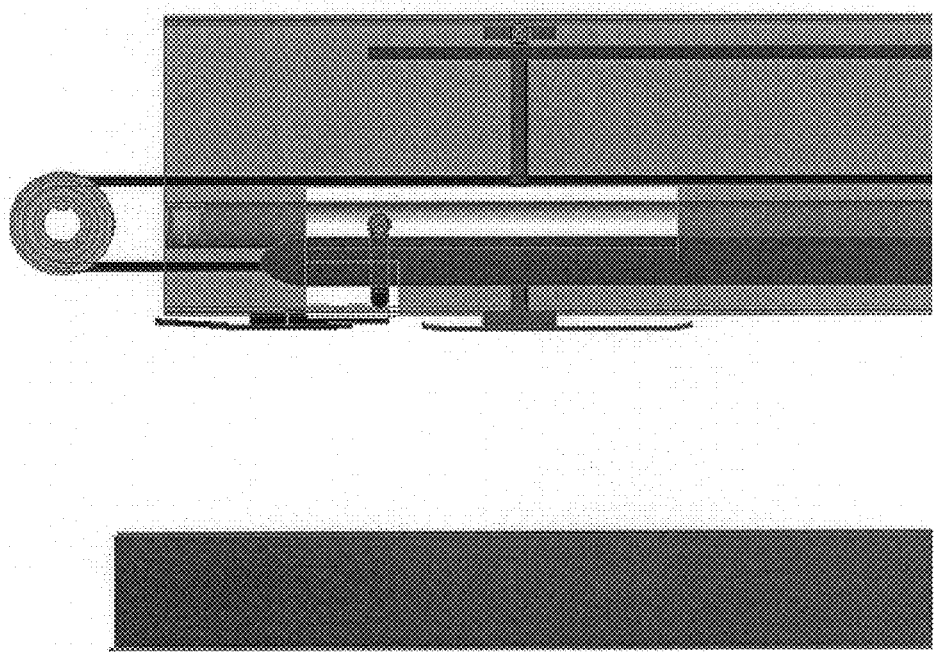
FIG. 76 is an illustration of a subsequent step in the operation of the apparatus shown in FIGS. 5–11.
Figure 77:
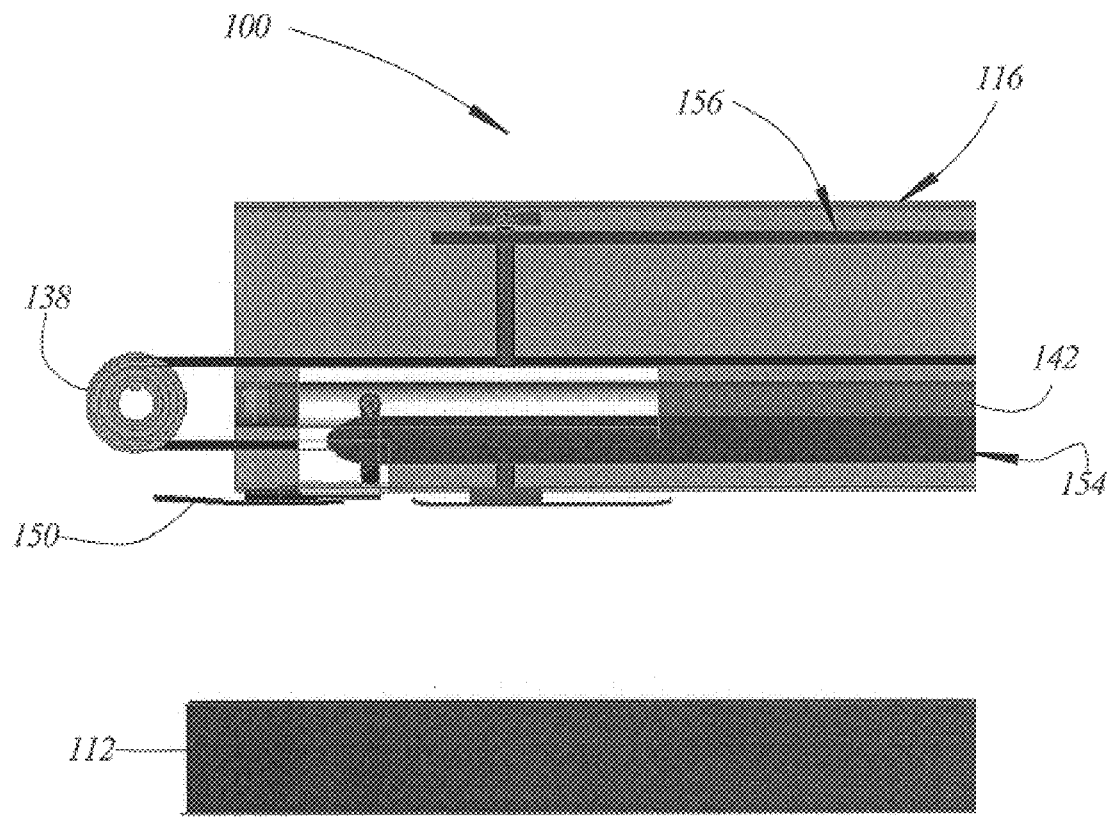
FIG. 77 is an illustration of a subsequent step in the operation of the apparatus shown in FIGS. 5–11.
Figure 78:
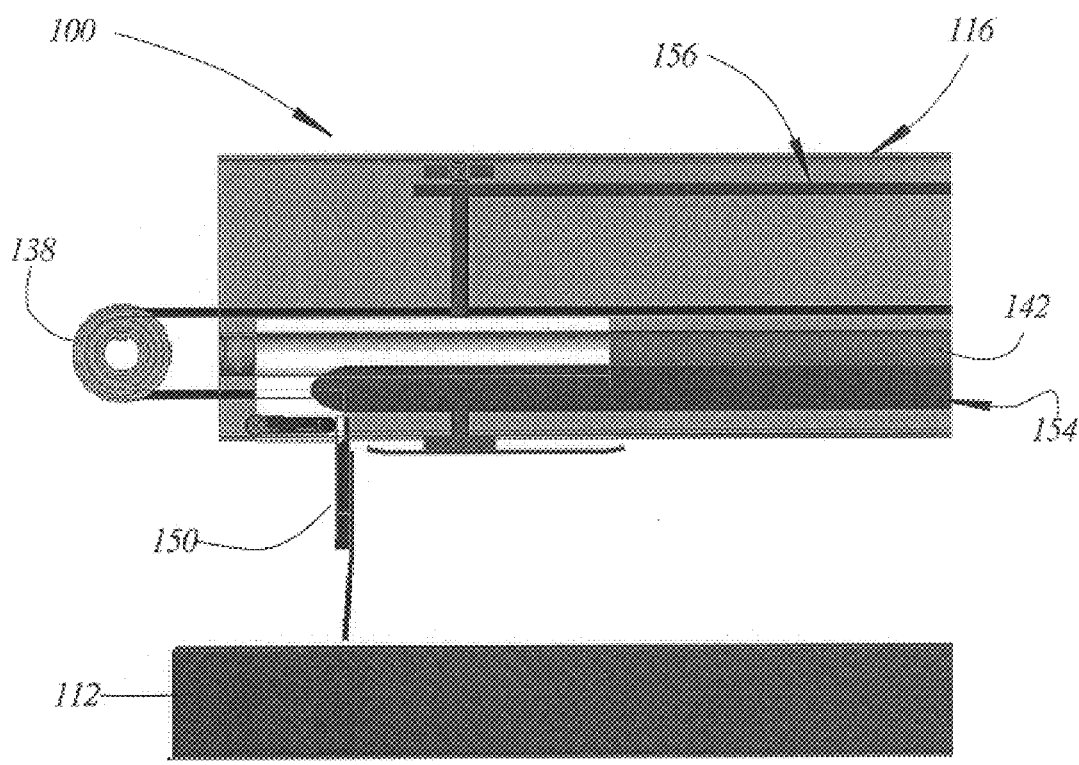
FIG. 78 is an illustration of a subsequent step in the operation of the apparatus shown in FIGS. 5–11.
Figure 79:
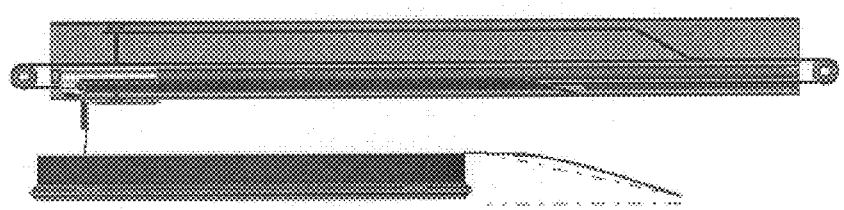
FIG. 79 is an illustration of a subsequent step in the operation of the apparatus shown in FIGS. 5–11.

The operation of the transfer apparatus 116 of the pattern former 100 is illustrated in FIGS. 12–79, inclusive. A plurality of wrapped bakery products P are positioned on the vacuum turntable 112. A bakery tray T is positioned to receive the wrapped bakery products P. A slip sheet 180 extends from the vacuum turntable 112 into the bakery tray T. The pusher plate 150 extends downwardly and engages the wrapped bakery products P. Under the action of the motor 140 operating through the belt 136, the pusher plate 150 begins to push the wrapped bakery products P toward the bakery tray T.

FIGS. 12–42, inclusive, depict the movement of the wrapped bakery products P away from the rotary turntable 112 and into the bakery tray T under the action of the pusher plate 150. As will be appreciated by those skilled in the art, the wrapped bakery products P follow a sliding movement downwardly along the upper surface of the slip sheet 180 as the wrapped bakery products P enter the bakery tray T.

Referring particularly to FIGS. 43–53, the movement of the wrapped bakery products P into the bakery tray T under the action of the pusher plate 150 eventually causes the bakery tray T to move away from the vacuum turntable 112 thereby disengaging the slip sheet 180 therefrom. FIGS. 48–53 illustrate the pivotally supported portion 166 of the pusher plate cam 154 pivoting upwardly to allow the cam followers 164 to pass thereunder.

FIGS. 53–63, inclusive, illustrate the final position of the movement of the wrapped bakery products P into the bakery tray T. The cam followers 176 eventually reach the end of the flat portions of the spanker plate cams 156 whereupon the spanker plate 152 is allowed to move downwardly. As will be appreciated by those skilled in the art, the spanker plate 152 is not forced downwardly, but instead moves downwardly under the action of gravity. The function of the spanker plate 152 is to assure that the last wrapped bakery product P comprising the pattern that was formed on the vacuum turntable 112 is fully seated in the bakery tray T. Simultaneously, the slip sheet 180 is fully disengaged from the bakery tray T as the bakery tray T moves away from the vacuum turntable 112 under the action of the pusher plate 150.

FIGS. 64–79, inclusive, illustrate the return movement of the traveler 142 and the apparatus carried thereby, that is, the movement of the traveler 142 away from the motor 140 and toward the vacuum turntable 112. As the cam followers 176 move into engagement with the inclined portion of the spanker plate cams 156, the spanker plate 152 is moved upwardly. As the cam followers 164 engage the pivotally supported portions 166 of the pusher plate cams 154, the pusher plate 150 is pivoted upwardly until it extends parallel to the belt 136.

Upward movement of the spanker plate 152 and upward pivotal movement of the pusher plate 150 allow the pusher plate 150 and the spanker plate 152 to pass over a subsequent pattern of wrapped bakery products that was formed on the vacuum turntable 112 as the pusher plate was moving the previously formed pattern of wrapped bakery products into the bakery tray T. The fact that a pattern of wrapped bakery products can be moved into a bakery tray and a subsequent pattern of wrapped bakery products can simultaneously be formed on the vacuum turntable 112 comprises an important feature of the present invention which substantially increases the throughput rate of pattern formers incorporated in the invention.

Referring particularly to FIGS. 76–79, inclusive, when the cam followers 164 reach the ends of the upper surfaces of the pusher plate cams 154, the pusher plate 150 drops down under the action of gravity and returns to its original positioning. The spanker plate 152 remains in its raised orientation under the action of the engagement of the cam followers 176 with the spanker plate cams 156. FIG. 79 illustrates the component parts of the apparatus 116 in their original orientation and ready to move a subsequent pattern of wrapped bakery products into a bakery tray.

The transfer apparatus 110 which moves groups of wrapped bakery products from the grouping apparatus 108 to the vacuum turntable 112 operates exactly the same as the transfer apparatus 116, the only difference being that the transfer apparatus 110 does not include a spanker plate. The transfer apparatus 110 includes a pusher plate 182 which is mounted on a belt driven traveler constructed similarly to and functioning identically to the traveler 142 and which is activated by cams constructed similarly to and functioning identically to the cams 154. Thus, the apparatus 110 operates identically to the operation of the pusher plate 150 of the transfer apparatus 116 in that it is positioned in a downwardly extending, operative orientation as it moves groups of bakery products from the grouping apparatus 108 to the vacuum turntable 112, and is cammed upwardly into a horizontally disposed orientation as it moves in the reverse direction, that is, away from the vacuum turntable 112 and back toward the grouping apparatus 108. In this manner the pattern former of the present invention functions to arrange a subsequent group of wrapped bakery products on the grouping apparatus 108 as the pusher plate 182 is moving a previous group of wrapped bakery products onto the turntable 112. The fact that the two operations occur simultaneously comprises an important feature of the pattern former 100 which substantially increases the throughput rate thereof.

Although preferred embodiments of the invention have been illustrated in the accompanying drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. In a pattern former of the type adapted to receive wrapped bakery products, to assemble the received wrapped bakery products into a predetermined pattern, and to transfer the predetermined pattern into a bakery tray, the improvement comprising:
   a vacuum turntable for receiving wrapped bakery products in groups and for assembling the received groups of wrapped bakery products into a predetermined pattern;
   the vacuum turntable comprising a perforated plate characterized by perforations having predetermined diameters and predetermined spacing between perforations; and
   a vacuum turntable drive apparatus including a drive belt extending around the exterior of the turntable and a drive motor for actuating the drive belt to position the turntable to receive and orient groups of wrapped bakery products.

2. The improvement according to claim 1 wherein the perforations comprising the perforated plate of the vacuum turntable are characterized by diameters of between about 0.0337 inches and about 0.0340 inches.

3. The improvement according to claim 1 wherein the perforations comprising the perforated plate of the vacuum turntable are spaced apart by a distance of between about 0.2186 inches and about 0.2225 inches.

4. The improvement according to claim 1 wherein the perforated plate of the vacuum turntable is characterized by a thickness of at least about 0.020 inches.

5. The improvement according to claim 1 further including a grouping apparatus for collecting individual wrapped bakery products into groups comprising between 1 and about 6 individual wrapped bakery products prior to the transfer of the groups of wrapped bakery products onto the vacuum turntable.

6. The improvement according to claim 5 further characterized by a pusher plate for moving wrapped bakery products from the grouping apparatus onto the vacuum turntable for assembly thereby into predetermined patterns of wrapped bakery products.

7. The improvement according to claim 6 further including apparatus for positioning the pusher plate and a substantially vertical orientation during the movement of wrapped bakery products from the grouping apparatus onto the vacuum turntable under the action of the pusher plate and for positioning the pusher plate in a substantially horizontal apparatus during return movement thereof, thereby facilitating the arranging of a subsequent group of wrapped bakery products on the grouping apparatus during the movement of a previous group of wrapped bakery products from the grouping apparatus onto the vacuum turntable.

8. The improvement according to claim 1 further characterized by a slip sheet extending from the vacuum turntable and a pusher plate for moving patterns of wrapped bakery products from the turntable along the slip sheet and into bakery trays.

9. The improvement according to claim 8 further characterizied by apparatus for positioning the pusher plate in a vertical orientation during movement of patterns of wrapped bakery products into bakery receiving trays under the action of the pusher plate and for positioning the pusher plate in a horizontal orientation during return movement thereof, thereby facilitating the assembly of a subsequent pattern of wrapped bakery products on the vacuum turntable during movement of a previous pattern of wrapped bakery products from the turntable into a bakery tray.

10. The improvement according to claim 9 further including a spanker plate and apparatus for reciprocating the spanker plate vertically to assure the positioning of the trailing portion of a pattern of bakery products in the receiving bakery tray.

11. In a pattern former of the type adapted to receive wrapped bakery products, to assemble the received wrapped bakery products into a predetermined pattern, and to transfer the predetermined pattern into a bakery tray, the improvement comprising:
    a transfer apparatus including a pusher plate for moving groups of wrapped bakery products onto a vacuum turntable and retractable to facilitate forming a subsequent group of wrapped bakery products as a previous group of wrapped bakery products is being transferred to the vacuum turntable.

12. The improvement according to claim 11 wherein the transfer apparatus further includes apparatus for positioning the pusher plate in a vertical orientation as the pusher plate moves groups of wrapped bakery products onto the vacuum turntable and for pivoting the pusher plate into a horizontal orientation as the pusher plate is moved away from the turntable.

13. The improvement according to claim 11 further characterized by a slip sheet extending from the vacuum turntable and a pusher plate for moving patterns of wrapped bakery products from the turntable along the slip sheet and into bakery trays.

14. The improvement according to claim 13 further including a spanker plate and apparatus for reciprocating the spanker plate vertically to assure the positioning of the trailing portion of a pattern of bakery products in the receiving bakery tray.

15. The improvement according to claim 14 wherein the perforations comprising the perforated plate of the vacuum turntable are characterized by diameters of between about 0.0337 inches and about 0.0340 inches.

16. The improvement according to claim 14 wherein the perforations comprising the perforated plate of the vacuum turntable are spaced apart by a distance of between about 0.2186 inches and about 0.2225 inches.

17. The improvement according to claim 14 wherein the perforated plate of the vacuum turntable is characterized by a thickness of at least about 0.020 inches.

18. The apparatus according to claim 11 further including a transfer apparatus for moving patterns of wrapped bakery products from the vacuum turntable into bakery trays comprising a pusher plate normally disposed to move patterns of wrapped bakery products from the vacuum turntable into bakery trays and retractable to facilitate the assembly of a subsequent pattern of wrapped bakery products while a previous pattern of wrapped bakery products is being moved from the vacuum turntable into a bakery tray.

19. The improvement according to claim 18 wherein the transfer apparatus for moving patterns of wrapped bakery products into bakery trays is further characterized by apparatus for positioning the pusher plate in a vertical orientation during movement of patterns of wrapped bakery products into bakery trays under the action of the pusher plate and for pivoting the pusher plate into a horizontal orientation during return movement thereof.

20. The improvement according to claim 11 wherein the vacuum table comprises a perforated plate characterized by perforations having predetermined diameters and predetermined spacing between perforations.

21. In a pattern former of the type adapted to receive wrapped bakery products, to assemble the received wrapped bakery products into a predetermined pattern, and to transfer the predetermined pattern into a bakery tray, the improvement comprising:

a transfer apparatus for moving predetermined patterns of wrapped bakery products from a vacuum turntable into bakery trays comprising a pusher plate normally disposed to move patterns of wrapped bakery products from the vacuum turntable into bakery trays and retractable to facilitate the assembly of a subsequent pattern of wrapped bakery products while a previous pattern of wrapped bakery products is being moved from the vacuum turntable to a bakery tray.

22. The improvement according to claim 21 wherein the transfer apparatus for moving patterns of wrapped bakery products into bakery trays is further characterized by apparatus for positioning the pusher plate in a vertical orientation during movement of patterns of wrapped bakery products into bakery trays under the action of the pusher plate and for pivoting the pusher plate into a horizontal orientation during return movement thereof.

23. The improvement according to claim 21 further including a spanker plate and apparatus for reciprocating the spanker plate vertically to assure the positioning of the trailing portion of a pattern of bakery products in the receiving bakery tray.

24. The improvement according to claim 21 wherein the vacuum table comprises a perforated plate characterized by perforations having predetermined diameters and predetermined spacing between perforations.

25. The improvement according to claim 24 wherein the perforations comprising the perforated plate of the vacuum turntable are characterized by diameters of between about 0.0337 inches and about 0.0340 inches.

26. The improvement according to claim 25 wherein the perforations comprising the perforated plate of the vacuum turntable are spaced apart by a distance of between about 0.2186 inches and about 0.2225 inches.

27. The improvement according to claim 26 wherein the perforated plate of the vacuum turntable is characterized by a thickness of at least about 0.020 inches.

28. The improvement according to claim 21 further including a transfer apparatus including a pusher plate for moving groups of wrapped bakery products onto the vacuum turntable and retractable to facilitate forming a subsequent group of wrapped bakery products as a previous group of wrapped bakery products is being transferred to the vacuum turntable.

29. The improvement according to claim 28 wherein the transfer apparatus further includes apparatus for positioning the pusher plate in a vertical orientation as the pusher plate moves groups of wrapped bakery products onto the vacuum turntable and for pivoting the pusher plate into a horizontal orientation as the pusher plate is moved away from the turntable.

30. The improvement according to claim 21 further characterized by a slip sheet extending from the vacuum turntable and wherein the pusher plate moves patterns of wrapped bakery products from the turntable along the slip sheet and into bakery trays.

31. A method of assembling wrapped bakery products into predetermined patterns and thereafter transferring the patterns of wrapped bakery products into bakery trays for transport including the steps of:

providing a grouping apparatus for receiving individually wrapped bakery products;

arranging groups of between 1 and about 6 wrapped bakery products on the grouping apparatus;

providing a vacuum turntable;

providing a transfer apparatus for moving groups of wrapped bakery products from the grouping apparatus onto the turntable; and arranging a subsequent group of wrapped bakery products on the grouping apparatus during movement of a previous group of wrapped bakery products from the grouping apparatus onto the vacuum turntable under the action of the transfer apparatus.

32. A method of forming wrapped bakery products into predetermined patterns thereafter transferring the patterns of wrapped bakery products into bakery trays including the steps of:

providing a vacuum turntable;

forming patterns of wrapped bakery products on the vacuum turntable;

providing a transfer apparatus;

moving patterns of wrapped bakery products from the vacuum turntable into bakery trays under the action of the transfer apparatus; and forming subsequent patterns of wrapped bakery products on the vacuum turntable during movement of previous patterns of wrapped bakery products into a bakery tray under the action of the transfer apparatus.

* * * * *

UNITED STATES PATENT AND TRADEMARK OFFICE
CERTIFICATE OF CORRECTION

PATENT NO.    : 6,401,435 B1
DATED         : June 11, 2002
INVENTOR(S)   : John M. Lucido et al.

It is certified that error appears in the above-identified patent and that said Letters Patent is hereby corrected as shown below:

Column 10,
Lines 10 and 12, replace "individual wrapped" with -- individually wrapped --.

Column 11,
Lines 37 and 67, replace "vacuum table" with -- vacuum turntable --.

Signed and Sealed this

Twenty-sixth Day of November, 2002

*Attest:*

*Attesting Officer*

JAMES E. ROGAN
*Director of the United States Patent and Trademark Office*